US012776314B2

(12) United States Patent
Kothari et al.

(10) Patent No.: US 12,776,314 B2
(45) Date of Patent: Oct. 27, 2026

(54) WEARABLE SILENT SPEECH DEVICE, SYSTEMS, AND METHODS FOR CONTROL

(71) Applicant: Wispr AI, Inc., San Francisco, CA (US)

(72) Inventors: Tanay Kothari, San Francisco, CA (US); John Tarasidis, San Mateo, CA (US); Anthony Leonardo, Broadlands, VA (US); Sahaj Garg, San Francisco, CA (US)

(73) Assignee: Wispr AI, Inc., San Francisco, CA (US)

( * ) Notice: Subject to any disclaimer, the term of this patent is extended or adjusted under 35 U.S.C. 154(b) by 146 days.

(21) Appl. No.: 18/487,627

(22) Filed: Oct. 16, 2023

(65) Prior Publication Data

US 2024/0221741 A1 Jul. 4, 2024

Related U.S. Application Data

(63) Continuation-in-part of application No. 18/338,827, filed on Jun. 21, 2023, now abandoned.
(Continued)

(51) Int. Cl.
*G10L 15/22* (2006.01)
*G06F 3/01* (2006.01)
(Continued)

(52) U.S. Cl.
CPC .............. *G10L 15/22* (2013.01); *G06F 3/015* (2013.01); *G06V 40/176* (2022.01); *G10L 15/25* (2013.01)

(58) Field of Classification Search
None
See application file for complete search history.

(56) References Cited

U.S. PATENT DOCUMENTS 6,594,630 B1 * 7/2003 Zlokarnik .............. G10L 15/26
704/E15.045
7,574,357 B1 8/2009 Jorgensen
(Continued)

FOREIGN PATENT DOCUMENTS

CA 2923979 A1 3/2014
CA 2942852 A1 9/2014
(Continued)

OTHER PUBLICATIONS

International Search Report and Written Opinion dated Apr. 26, 2024, in connection with International Application No. PCT/US24/10268.

(Continued)

*Primary Examiner* — Seong-Ah A Shin
(74) *Attorney, Agent, or Firm* — Wolf, Greenfield & Sacks, P.C.

(57) ABSTRACT

Techniques, including a system, device, and method, for controlling a silent speech wearable device are provided. The techniques may record signals using a wearable device, worn by a user. The techniques may analyze the signals recorded by the wearable device to determine an action, word, and/or phrase performed or said by the user. The techniques may comprise using machine learning models to analyze the signals. The techniques may comprise template matching and/or pattern recognition to analyze the signals. The techniques may involve changing a state and/or a mode of the device in response to the signals.

16 Claims, 16 Drawing Sheets

Related U.S. Application Data

(60) Provisional application No. 63/437,088, filed on Jan. 4, 2023.

(51) Int. Cl.
*G06V 40/16* (2022.01)
*G10L 15/25* (2013.01)

(56) References Cited

U.S. PATENT DOCUMENTS

| | | | | |
|---|---|---|---|---|
| 8,082,149 | B2 | 12/2011 | Schultz et al. | |
| 8,200,486 | B1 | 6/2012 | Jorgensen | |
| 9,013,264 | B2 | 4/2015 | Parshionikar et al. | |
| 9,432,768 | B1* | 8/2016 | O'Neill | H04R 3/005 |
| 10,261,749 | B1 | 4/2019 | Wilcox | |
| 10,559,145 | B1 | 2/2020 | Almehmadi | |
| 10,621,973 | B1 | 4/2020 | McVicker | |
| 10,834,265 | B1 | 11/2020 | Antunes | |
| 10,878,818 | B2 | 12/2020 | Kapur et al. | |
| 11,709,548 | B2 | 7/2023 | Tadi et al. | |
| 11,715,042 | B1 | 8/2023 | Liu | |
| 11,908,478 | B2 | 2/2024 | Maizels | |
| 12,020,677 | B1 | 6/2024 | Alavo | |
| 12,518,053 | B2 | 1/2026 | Selvaraju | |
| 2005/0102134 | A1* | 5/2005 | Manabe | G10L 25/78 704/207 |
| 2006/0167530 | A1 | 7/2006 | Flaherty | |
| 2010/0195812 | A1 | 8/2010 | Florencio | |
| 2011/0307253 | A1 | 12/2011 | Lloyd | |
| 2012/0095768 | A1* | 4/2012 | McClung, III | G10L 15/22 704/E11.001 |
| 2012/0259554 | A1* | 10/2012 | Chen | A61F 4/00 702/19 |
| 2012/0290950 | A1 | 11/2012 | Rapaport et al. | |
| 2014/0010389 | A1* | 1/2014 | Slocum | H04R 1/1066 381/379 |
| 2014/0176398 | A1* | 6/2014 | West | G02B 27/0176 345/8 |
| 2015/0086052 | A1 | 3/2015 | Park et al. | |
| 2015/0313496 | A1 | 11/2015 | Connor | |
| 2016/0134840 | A1 | 5/2016 | McCulloch | |
| 2016/0314781 | A1 | 10/2016 | Schultz et al. | |
| 2017/0061034 | A1 | 3/2017 | Ritchey et al. | |
| 2017/0084266 | A1 | 3/2017 | Bronakowski | |
| 2017/0131768 | A1 | 5/2017 | Budavari et al. | |
| 2017/0249009 | A1 | 8/2017 | Parshionikar et al. | |
| 2017/0296121 | A1* | 10/2017 | Dar | A61B 5/6803 |
| 2017/0368329 | A1* | 12/2017 | Tyler | G10L 15/02 |
| 2018/0017208 | A1* | 1/2018 | Shanley, IV | F16M 13/04 |
| 2018/0021021 | A1* | 1/2018 | Zwierstra | A61B 5/6814 600/453 |
| 2018/0046851 | A1 | 2/2018 | Kienzle et al. | |
| 2018/0239956 | A1 | 8/2018 | Tadi et al. | |
| 2018/0240463 | A1* | 8/2018 | Perotti | G10L 17/22 |
| 2019/0074012 | A1* | 3/2019 | Kapur | G10L 15/25 |
| 2019/0295566 | A1 | 9/2019 | Moghadamfalahi | |
| 2019/0348027 | A1 | 11/2019 | Bernzweig | |
| 2020/0129856 | A1* | 4/2020 | Bond | A63F 13/65 |
| 2020/0258535 | A1* | 8/2020 | Vatanparvar | A61B 5/4803 |
| 2021/0012764 | A1 | 1/2021 | Yoo | |
| 2021/0012770 | A1 | 1/2021 | Choudhary | |
| 2021/0105340 | A1* | 4/2021 | Grozdanov | G06F 40/166 |
| 2021/0124422 | A1 | 4/2021 | Forsland | |
| 2021/0183363 | A1* | 6/2021 | Hempel | H04R 25/554 |
| 2021/0183366 | A1 | 6/2021 | Reinspach | |
| 2021/0183383 | A1* | 6/2021 | Volovich | H04R 1/1016 |
| 2021/0306751 | A1 | 9/2021 | Roach | |
| 2022/0027447 | A1 | 1/2022 | Keith | |
| 2022/0084522 | A1 | 3/2022 | Im | |
| 2022/0137702 | A1 | 5/2022 | Min et al. | |
| 2022/0160296 | A1 | 5/2022 | Rahmani et al. | |
| 2022/0187912 | A1 | 6/2022 | Alcaide et al. | |
| 2022/0206986 | A1* | 6/2022 | Vega Galvez | A61B 5/682 |
| 2022/0208194 | A1 | 6/2022 | Rameau et al. | |
| 2022/0262344 | A1 | 8/2022 | Yoon | |
| 2023/0072423 | A1 | 3/2023 | Osborn et al. | |
| 2023/0077010 | A1 | 3/2023 | Zhang et al. | |
| 2023/0078978 | A1 | 3/2023 | Tadi et al. | |
| 2023/0130770 | A1 | 4/2023 | Miller et al. | |
| 2023/0157757 | A1 | 5/2023 | Braido et al. | |
| 2023/0157762 | A1 | 5/2023 | Braido et al. | |
| 2023/0190196 | A1* | 6/2023 | Wang | A61B 5/265 600/383 |
| 2023/0230574 | A1* | 7/2023 | Maizels | G06V 40/171 704/260 |
| 2023/0230575 | A1 | 7/2023 | Maizels | |
| 2023/0260536 | A1 | 8/2023 | Xu | |
| 2024/0069359 | A1* | 2/2024 | Baker | G02C 5/2263 |
| 2024/0094800 | A1* | 3/2024 | Howell | G02C 11/06 |
| 2024/0177713 | A1* | 5/2024 | Maizels | G06V 40/171 |
| 2024/0194179 | A1 | 6/2024 | Lee | |
| 2024/0203408 | A1* | 6/2024 | Li | G10L 15/187 |
| 2024/0220016 | A1 | 7/2024 | Garg et al. | |
| 2024/0220811 | A1 | 7/2024 | Garg et al. | |
| 2024/0221718 | A1 | 7/2024 | Kothari et al. | |
| 2024/0221719 | A1 | 7/2024 | Kothari et al. | |
| 2024/0221738 | A1 | 7/2024 | Garg et al. | |
| 2024/0221751 | A1 | 7/2024 | Garg et al. | |
| 2024/0221753 | A1 | 7/2024 | Garg et al. | |
| 2024/0221762 | A1 | 7/2024 | Garg et al. | |
| 2024/0250540 | A1* | 7/2024 | Patton | G02C 11/10 |
| 2024/0366157 | A1 | 11/2024 | Moses | |
| 2025/0061885 | A1 | 2/2025 | Garg et al. | |
| 2025/0085780 | A1 | 3/2025 | Ziv | |
| 2025/0124925 | A1 | 4/2025 | Maizels | |

FOREIGN PATENT DOCUMENTS

| | | | |
|---|---|---|---|
| CA | 2998687 | A1 | 5/2018 |
| CA | 3164001 | A1 | 7/2021 |
| CA | 2942852 | C | 3/2023 |
| CA | 2 957 766 | C | 10/2023 |
| CN | 101902960 | A | 12/2010 |
| CN | 112424859 | A | 2/2021 |
| CN | 114703091 | A | 7/2022 |
| KR | 10-2015-0104345 | A | 9/2015 |
| KR | 10-2020-0127150 | A | 11/2020 |
| WO | WO 2019/040669 | A1 | 2/2019 |
| WO | WO 2022/020968 | A1 | 2/2022 |
| WO | WO 2022/245833 | A2 | 11/2022 |

OTHER PUBLICATIONS

Gaddy et al., Digital Voicing of Silent Speech. arXiv:2010.02960v1 [eess.AS] Oct. 6, 2020. 10 pages.

Gaddy et al., An Improved Model for Voicing Silent Speech. Proceedings of the 59th Annual Meeting of the Association for Computational Linguistics and 11th International Joint Conference on Natural Language Processing. Aug. 1-6, 2021. pp. 175-181.

Meltzner et al., Development of sEMG sensors and algorithms for silent speech recognition. J Neural Eng. Aug. 2018;15(4):046031. doi: 10.1088/1741-2552/aac965. Epub Jun. 1, 2018. PMID: 29855428; PMCID: PMC6168082.

Meltzner GS, Heaton JT, Deng Y, De Luca G, Roy SH, Kline JC. Silent Speech Recognition as an Alternative Communication Device for Persons with Laryngectomy. IEEE/ACM Trans Audio Speech Lang Process. Dec. 2017;25(12):2386-2398. doi: 10.1109/TASLP. 2017.2740000. Epub Nov. 28, 2017. PMID: 29552581; PMCID: PMC5851476.

Kapur et al., Alterego: A Personalized Wearable Silent Speech Interface. Session 1B: Multimodel Interfaces. IUI. Mar. 7-11, 2018. 11 Pages.

Kapur, How AI Could Become an Extension of your mind. TED. YouTube. Jun. 6, 2019.

He et al., Unvoiced Speech Recognition Algorithm Based on Myoeletric Signal. ICMLC. Feb. 15-17, 2020. 7 Pages.

Herff et al., Impact of Different Feedback Mechanisms in EMG-based Speech Recognition. Interspeech. Aug. 28-31, 2011:2213-2216.

(56) References Cited

OTHER PUBLICATIONS

Ishak, Speaker Identification Based on Vocal Cords Vibrations signal: Effect of the Window. International Journal of Digital Information and Wireless Communications. Jan. 2018. DOI:10.17781/P002406. 6 Pages.
Jou et al., Articulatory Feature Classification Using Surface Electromyography. International Central for Advanced Technologies. IEEE. 2006. 4 Pages.
Jou et al., Towards Continuous Speech Recognition Using Surface Electromyography. Interspeech. Sep. 17-21, 2006. 4 Pages.
Karnjanedecha et al., Signal Modeling for High-Performance Robust Isolated Word Recognition. IEEE Transactions of Speech and Audio Processing. Sep. 2001;9(6):647-654.
Maier-Hein, Speech Recognition Using Surface Electromyography. Diplomarbeit. Aug. 2005. 129 Pages.
Maier-Hein et al., Session Independent Non-Audible Speech Recognition Using Surface Electromyography. IEEE. 2005. 6 Pages.
Manabe et al., Unvoiced Speech Recognition using EMG—Mime Speech Recognition—.Short Talk: Brains, Eyes and Ears. CHI. Apr. 5-10, 2003. 2 Pages.
Jamil et al., A flexible Speech Recognition System for Cerebral Palsy Disabled. ICIEIS. 2011. pp. 42-55.
Polur et al., experiments with Fast Fourier Transform, Linear Predictive and Cepstral Coefficients in Dysarthric Speech Recognition Algorithms Using Hidden Markov Model. IEEE Transactions on Neural Systems and Rehabilitation Engineering. Dec. 2005;13(4):558-561.
Prajapati et al., A Survey on Isolated Word and Digit Recognition Using Different Techniques. International Journal of Computer Applications (0975-8887). Mar. 2017;161(3). 10 Pages.
Rajasekaran et al., Recognition of Speech Under Stress and in Noise. ICASSP. 1986. 4 Pages.
Schultz et al., Modeling coarticulation in EMG-based continuous speech recognition. ScienceDirect. Speech Communications 52 (2010). Dec. 2, 2009. 13 Pages.
Toruk et al., Short Utterance Speaker Recognition Using Time-Delay Neural Network. 16th International Multi-Conference on Systems, Signals & Devices (SSD'19). 2019. 4 Pages.
Wand, Advancing Electromyographic Continuous Speech Recognition. Signal Preprocessing and Modeling. Scientific Publishing. Jan. 14, 2014. 256 Pages.
Wand, Speaker-Adaptive Speech Recognition Based on Surface Elecgtromyography. IJCBEST. 2009. 15 Pages.
Wand, Towards Real-life Application of EMG-based Speech Recognition by using Unsupervised Adaptation. Interspeech. Sep. 14-18, 2014. 5 Pages.
Wand et al., The EMG-UKA for Electromyographic Speech Processing. Interspeech. Sep. 14-18, 2019. 5 Pages.
Wand et al., Towards Speaker-Adaptive Speech Recognition Based on Surface Electromyography. ICBSSP. 2009. 8 Pages.
Zhou et al., Improved Phoneme-Based Myoelectric Speech Recognition. IEEE Transactions on Biomedical Engineering. Aug. 2009;56(8). 8 Pages.
Guo et al., Deep Multi-modality Soft-decoding of Very Low Bit-rate Face Videos. ACM Digital Library. Oct. 12, 2020. 10 Pages.
Janke et al., EMG-to-Speech: Direct Generation of Speech from Facial Electromyographic Signals. IEEE/ACM Transactions on Audio, Speech, and Language Processing. Dec. 2017;25(12):2375-85.
U.S. Appl. No. 18/648,138, filed Apr. 26, 2024, Garg.
PCT/US24/10268, Apr. 26, 2024, International Search Report and Written Opinion.

* cited by examiner

WEARABLE SILENT SPEECH DEVICE, SYSTEMS, AND METHODS FOR CONTROL

CROSS-REFERENCE TO RELATED APPLICATIONS

This application is a Continuation-in-part of U.S. application Ser. No. 18/338,827, filed Jun. 21, 2023, entitled "WEARABLE SILENT SPEECH DEVICE, SYSTEMS, AND METHODS", which is a Non-Provisional of Provisional (35 USC 119(e)) of U.S. Application Ser. No. 63/437,088, filed Jan. 4, 2023, entitled "SYSTEM AND METHOD FOR SILENT SPEECH DECODING". The entire contents of these applications are incorporated herein by reference in their entirety.

BACKGROUND

Traditional communication modalities and interactive systems require user inputs including voiced speech, typing and/or selection of various system inputs during use. Many of these interactive systems use various input methods and devices, such as microphones, keyboard/mouse devices and other devices and methods for receiving inputs from users. It is often desirable for these systems to support extended use, for example over periods of multiple hours, such that users may perform tasks without interruption from the system.

SUMMARY

The inventors have recognized and appreciated that conventional interactive systems are unable meet the real-world needs of users. For example, it is not always practical for a user to enter text with a keyboard. Also, some existing systems accept user's voice as input to the systems. However, voice-based systems may not always be practical when the environment has noise (e.g., in a public place, in an office etc.) or privacy is of concern.

According to one aspect a wearable device is provided. The wearable device includes a plurality of sensors configured to measure signals at a face, head, or neck of a user, the signals being indicative of facial activity associated with an act performed by the user; a signal analysis component configured to analyze the signals and generate an activation signal responsive to results of the analysis of the signals; and a control component configured to activate the wearable device in response to the activation signal.

In some embodiments, the signal analysis component is configured to generate the activation signal in response to determining the user is silently speaking. The signal analysis component is configured to generate the activation signal in response to: determining the user is silently speaking or determining the user has performed a particular action. In some embodiments, the particular action includes the user clenching their teeth, tapping a cheek, or an action associated with the user preparing to speak.

In some embodiments, the control component is configured to activate the wearable device by activating a communication component of the device and transmitting the signals to a connected device. In some embodiments, the control component is configured to activate the wearable device by activating a processor of the device to determine one or more words or phrases from the measured signals.

In some embodiments, the signal analysis component is configured to generate the activation signal in response to determining a signal of the recorded signals is above a respective threshold. In some embodiments, wherein the plurality of sensors comprises: a plurality of EMG electrodes configured to record signals at a check of the user associated with movement of facial muscles of the user; and the signal analysis component is configured to generate the activation signal in response to determining a signal from the EMG electrodes is above a respective threshold. In some embodiments, the plurality of sensors further comprises: a microphone, and the signal analysis component is configured to generate the activation signal in response to determining the signal from the EMG electrodes is above the respective threshold and a voice level of the user in a signal recorded by the microphone is below a respective threshold voice level. In some embodiments, the plurality of sensors further comprises: an IMU configured to measure vibrations associated with voiced speech of the user, and the signal analysis component is configured to generate the activation signal in response to determining a signal from the EMG electrodes is above a respective threshold and a signal recorded by the IMU is below a respective threshold level.

In some embodiments, the signal analysis component is configured to: in response to determining the signal is above the respective threshold, perform template matching of parts of the signal to parts of a known speech signal; and in response to determining, based on the template matching, a measure of similarity between the signal and the known signal is above a threshold level of similarity, generate the activation signal. In some embodiments, the signal analysis component is further configured to: in response to determining the signal is above the respective threshold, perform template matching of parts of the signal to parts of a known action signal. In some embodiments, the signal analysis component is further configured to: in response to determining, based on the template matching, a measure of similarity between the signal and the known signal is below the threshold level of similarity and above a second level of similarity, analyze the signal using a trained machine learning model to determine whether the user is speaking; and generate the activation signal in response to determining the user is speaking.

In some embodiments, the plurality of sensors comprises: a plurality of EMG electrodes configured to record signals at a check of the user associated with movement of facial muscles of the user; and the signal analysis component is further configured to: determine a whether the wearable device has proper placement on the user by analyzing an impedance of a subset of EMG electrodes of the plurality of EMG electrodes; and in response to determining the wearable device has proper placement on the user, analyze the signals.

In some embodiments, the signal analysis component is further configured to: in response to determining the signal is above the respective threshold, perform analog to digital conversion of the signals at a first sampling frequency to generate first digital signals; analyze the first digital signals to determine a probability of whether the user is speaking; and generate the activation signal in response to determining the probability is above a first threshold probability. In some embodiments, the signal analysis component is further configured to perform analog to digital conversion of the signals at a second sampling frequency, higher than the first sampling frequency in response to determining the probability is below the first threshold probability and above a second threshold probability.

In some embodiments, the signal analysis component is further configured to: in response to determining the signal is above the respective threshold, analyze signals from a first subset of the sensors to determine a probability of whether the user is speaking; generate the activation signal in response to determining the probability is above a first threshold probability; and in response to determining the probability is below the first threshold probability and above a second threshold probability, analyze signals from a second subset of the sensors comprising more sensors than the first subset of sensors to determine whether the user is speaking.

According to another aspect, a method is provided. The method is for controlling a wearable device and includes: recording signals indicative of facial activity associated with an act performed by a user, at a face, head, or neck of the user; analyzing the recorded signals; and activating the wearable device based on the analyzing.

In some embodiments, the analyzing comprises determining a probability the user is silently speaking and the activating is performed in response to determining the probability is greater than a threshold probability. In some embodiments, the analyzing comprises determining a probability the user is silently speaking and determining a probability the user has performed a particular action and the activating is performed in response to determining the probability the user is silently speaking or the probability the user has performed a particular action is greater than a respective threshold probability.

BRIEF DESCRIPTION OF FIGURES

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. In the figures:

DETAILED DESCRIPTION

To solve the above-described technical problems and/or other technical problems, the inventors have recognized and appreciated that silent speech or sub-vocalized speech may be particularly useful in communication and may be implemented in in interactive systems. In these systems, for example, users may talk to the system via silent speech or whisper to the system in a low voice for the purposes for providing input to the system and/or controlling the system. It is important for such systems to be available to users over extended periods of time in order to allow for effective and continued use and communication.

In at least some embodiments as discussed herein, silent speech is speech in which the speaker does not vocalize their words out loud, but instead mouths the words as if they were speaking with vocalization. These systems could enable users to enter a prompt by speech or communicate silently, but do not have the aforementioned drawbacks associated with voice-based systems. In some embodiments, as discussed herein, silent speech may include the speaker speaking without vocalization, whispering and/or speaking softly.

Accordingly, the inventors have developed new technologies for silent speech devices allowing the devices to automatically adapt to the current actions of the wearer, allowing for continued interaction with mobile devices, smart devices, communication systems and interactive systems. In some embodiments, the techniques may include a wearable device configured to recognize speech signals of a user including electrical signals indicative of a user's facial muscle movement when the user is speaking (e.g., silently or with voice), motion signals associated with the movement of a wearer's face, vibration signals associated with voiced speech, and/or audio signals, and change its operation in response to the signals. In some examples, the wearable device may additionally or alternatively measure a position of a user's tongue, blood flow of the user, muscle strain of the user, muscle frequencies of the user, temperatures of the user, and magnetic fields of the user, among other signals. Any such signal may be used with the technologies described herein.

Figure 1A:
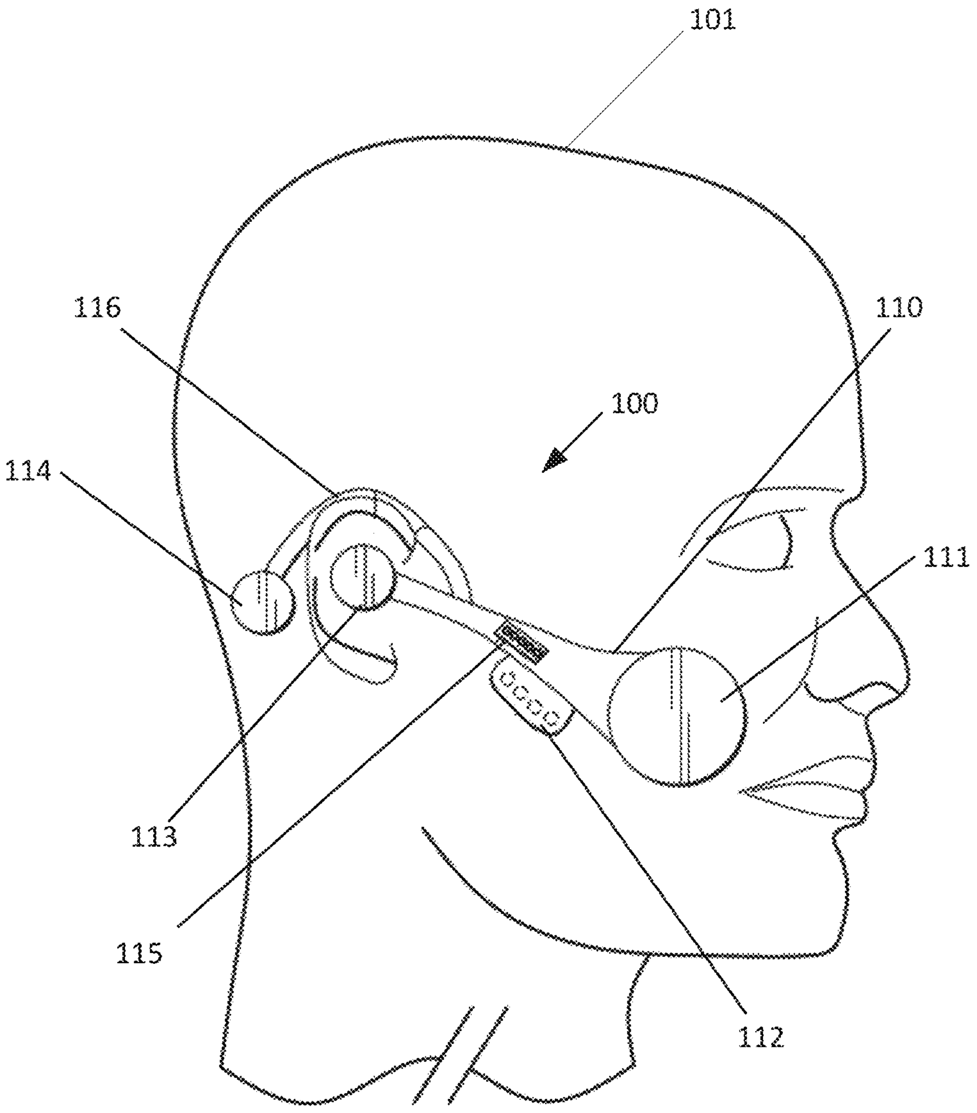
FIG. 1A depicts a view of a user 101 wearing an embodiment of a wearable device 100, in accordance with some embodiments of the technology described herein.

FIG. 1A depicts a view of a user 101 wearing an embodiment of a wearable device 100, in accordance with some embodiments of the technology described herein. The wearable device may comprise an ear hook 116 configured to fit around the top of a user's ear. The ear hook 116 may support a sensor arm 110 of the wearable device 100 and a reference electrode 114 of the device. The ear hook may be adjustable to conform to the anatomy of a user. The wearable device 100 may additionally include one or more inputs 115, accessible to the user 101 while the wearable device 100 is being worn. The one or more inputs 115 may include buttons, switches, sliders, and/or capacitive sensors, among other inputs. In some examples, a user may make an input to such input sensors, and in response the wearable device may change states or modes. The input sensors may also be used to turn a wearable device fully off or on.

The wearable device may comprise a sensor arm 110, supported by the ear hook 116. The sensor arm 110 may contain one or more sensors for recording speech signals from the user 101. The one or more sensors supported by the sensor arm may include EMG electrodes 111 configured to detect EMG signals associated with speech of the user. The EMG electrodes may be configured as an electrode array or may be configured as one or more electrode arrays supported by the sensor arm 110 of the wearable device 100.

In some examples, the wearable device may be connected to an external device which may provide inputs to the wearable device. For example, the wearable device may be connected to a smartphone, tablet, computer, laptop computer, desktop computer, a presentation device, smart watch, smart ring, another smart wearable device, among other devices. The external devices may have one or more input sensors which allow the user 101 to provide an input to the external device. The external device may then transmit a signal indicative of the input to the wearable device. The wearable device may then perform one or more actions in response to the signals indicative of the input to the external device.

In some examples, the EMG electrodes 111 may be configured as a differential amplifier, wherein the electrical signals represent a difference between a first voltage measured by a first subset of electrodes of the plurality of electrodes and a second voltage measured by a second subset of electrodes of the plurality of electrodes. Circuitry for the differential amplifier may be contained within the wearable device 100.

The sensor arm may support additional sensors 112. The additional sensors 112 may include a microphone for recording voiced or whispered speech, and an accelerometer or IMU for recording vibrations associated with speech such as glottal vibrations produced during voiced speech. In some examples the IMU may additionally or alternatively be used to measure facial movements. In some examples the wearable device includes multiple IMUs including at least one IMU configured to measure vibrations associated with speech and at least one IMU configured to measure facial movements. In some examples IMUs may be filtered at different frequencies, depending on whether they are measuring speech vibrations or facial motion. For example, IMU filtering at a lower frequency, for example 5-50 Hz, may measure facial motion related to speech and IMU filtering at a higher frequency, for example 100+Hz, may measure vibrations associated with speech. The additional sensors 112 may include sensors configured to measure a position of a user's tongue, blood flow of the user, muscle strain of the user, muscle frequencies of the user, temperatures of the user, and magnetic fields of the user, among other signals. The additional sensors 112 may include photoplethysmogram sensors, photodiodes, optical sensors, laser doppler imaging, mechanomyography sensors, sonomyography sensors, ultrasound sensors, infrared sensors, functional near-infrared spectroscopy (fNIRS) sensors, capacitive sensors, electroglottography sensors, electroencephalogram (EEG) sensors, and magnetoencephalography (MEG) sensors, among other sensors.

In some examples, the wearable device may comprise one or more sensors which detect whether the wearable device 100 is properly positioned on the user. In some examples, the wearable device may include an optical sensor which detects whether the device is properly positioned on the user, for example the optical sensor may determine placement within the ear of the user, or on the check of the user, among other locations. In some examples, the wearable device may determine the impedance levels of the EMG electrodes 111 and may determine if the wearable device 100 is properly positioned on the user based on the determined impedance levels. The EMG electrodes 111 may exhibit low impedance if the sensors are properly positioned on the user and high impedance if the sensors are not properly positioned. The wearable device 100 may determine the impedance level of any suitable number of EMG electrodes 111, for example, a single electrode may be checked, 2 electrodes may be checked, 3 electrodes may be checked, any subset of the electrodes may be checked, or all electrodes may be checked. The wearable device 100 may determine it is properly positioned when a threshold number of electrodes are determined to have low impedance. The threshold number of electrodes may be any suitable number of electrodes and may be based on the number of electrodes checked for impedance levels. For example, the threshold number of electrodes may be one electrode, 2 electrodes, 3 electrodes, or any subset of electrodes determined to have low impedance. In some examples, the wearable device may not record, analyze and/or process signals from sensors of the wearable device until it is determined the wearable device is properly positioned on the user 101.

In some examples, the wearable device 100 may determine whether the electrodes are properly placed by applying a known electrical current to the EMG electrodes 111. If the device is not properly placed on the user, one or more of the EMG electrodes may not be contacting the skin of the user. When the known current is applied to EMG electrodes which are not contacting the skin of the user, a voltage may be developed on the inputs of the EMG electrodes, which modulates the input values and is measurable at the EMG electrode outputs. Based on measured voltage, it may be determined the impedance of the of the signal from EMG electrode inputs is high. In some examples, analog to digital conversion of the voltage may be performed on the signal measured at the EMG electrode outputs to determine the impedance. The wearable device determines based on the measured voltage and/or determined impedance, the wearable device 100 is not properly placed on the user.

In some examples, when the known current is applied to EMG electrodes which are properly placed on the user (contacting the skin of the user), the current may flow through the EMG electrodes to the skin of the user and back to the device via another connection to the body, for example the reference electrode 114. This path for the known current is in parallel with the EMG electrode inputs, however has a much lower impedance than the EMG electrode inputs. The wearable device may determine the impedance based on the measured signals. The wearable device may therefore, based on the determined lower impedance, recognize the EMG electrodes are properly placed on the user.

In some examples, the known current is a DC current, which generates a constant voltage. The voltage may vary based on the impedance of the current path, which may be recognized by the wearable device 100. In some examples, the known current is an AC current, which is applied at a known frequency. In some examples, the known AC current may be characterized by its peak current. The known AC current creates a voltage which may be recognized by the wearable device 100 through extraction from sensor data using frequency decomposition techniques such as Fourier or quadrature methods. The wearable device 100 may perform EMG electrode and impedance measurement through the same sensor, when a known AC current is used because of the bandwidth of the signal having multiple current levels which can be used.

The ear hook 116 may additionally support one or more reference electrodes 114. The reference electrode 114 may be placed are located on a side of the ear hook 116, facing the user 101. In some examples reference electrode 114 may be configured to bias the body of the user such that the body is an optimal range for sensors of the system including sensors 112 and EMG electrodes 111. In some examples, the reference electrode 114 is configured to statically bias the body of the user. In some examples, the reference electrode 114 is configured to dynamically bias the body of the user.

The wearable device 100 may include a speaker 113 positioned at an end of the sensor arm. The speaker 113 is positioned at the end of the sensor arm 110 closest the user's ear. The speaker 113 may be inserted into the user's ear to play sounds, may perform bone conducting to play sounds to the user, or may play sounds aloud adjacent to the user's ear. The speaker 113 may be used to play outputs of silent speech processing or communication signals as discussed herein. In addition, the speaker 113 may be used to play one or more outputs from a connected external device, or the wearable device, such as music, audio associated with video or other audio output signals.

The wearable device 100 may include other components which are not pictured. These components may include a battery, a charging port, a data transfer port, among other components.

Wearable device 100 is an example of a wearable device which may be used in some embodiments of the technology described herein. Additional examples of wearable devices which may be used in some embodiments of the technology described herein include are described in U.S. patent application Ser. No. 18/338,827, titled "WEARABLE SILENT SPEECH DEVICE, SYSTEMS, AND METHODS", filed Jun. 21, 2023, the entirety of which is incorporated by reference herein.

Figure 1B:
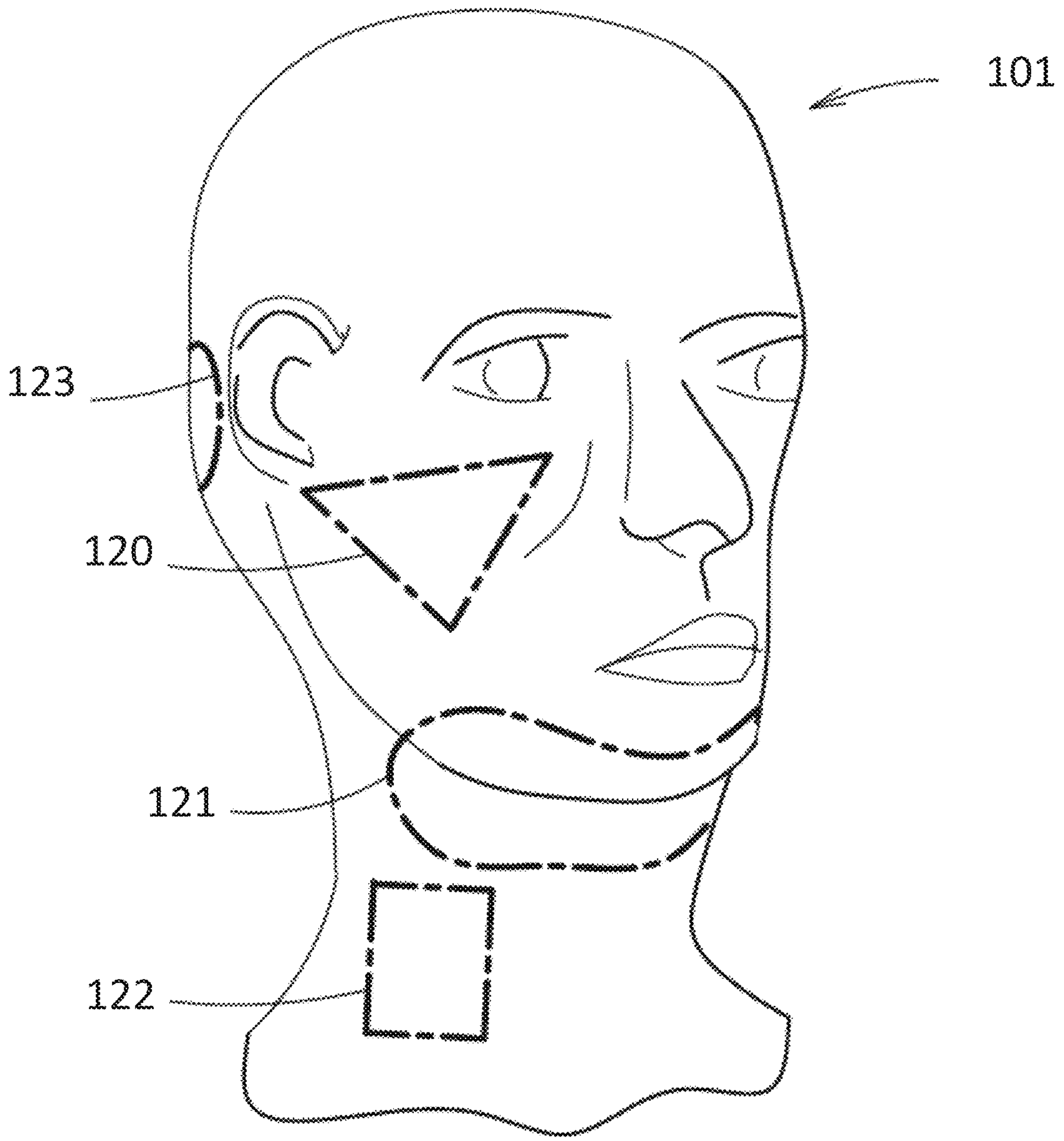
FIG. 1B is an illustration of wearable device target zone(s) associated with a wearable speech input device such as wearable device 100 (FIG. 1A), in accordance with some embodiments of the technology described herein.

FIG. 1B is an illustration of wearable device target zone(s) associated with a wearable speech input device such as wearable device 100 (FIG. 1A), in accordance with some embodiments of the technology described herein. The target zones may include one or more areas on or near the user's body part, in which sensor(s) can be placed to measure speech muscle activation patterns while the user is speaking (silently or with voice) or preparing to speak. For example, the speech muscle activation patterns at various target zones may include facial muscle movement, neck muscle movement, chin muscle movement, or a combination thereof associated with the user speaking. In some examples, the sensors may be placed at or near a target zone at which the sensors may be configured to measure the blood flow that occurs as a result of the speech muscle activation associated with the user speaking. Thus, the wearable device 100 may be configured to have its sensors positioned to contact one or more target zones, such as the face and neck of the user.

With further reference to FIG. 1B, various target zones are shown. In some embodiments, a first target zone 120 may be on the check of the user 101. This first target zone 120 may be used to record electrical signals associated with muscles in the face and lips of the user, including the zygomaticus of the user, the masseter of the user, the buccinator of the user, the risorius of the user, the platysma of the user, the orbicularis oris of the user, the depressor anguli oris of the user, the depressor labii, the mentalis, and the depressor septi of the user.

In some embodiments, various sensors may be positioned at the first target zone 120. For example, electrodes (e.g., 111 in FIG. 1A) supported by the wearable device 100 (e.g., via a sensor arm 110) may be positioned to contact the first target zone 120 of the user. In some embodiments, sensors configured to measure the position and activity of the user's tongue may be supported at the first target zone 120 by the sensor arm. In some embodiments, accelerometers configured to measure movement of the user's face may be placed at the first target zone 120.

In some embodiments, a second target zone 121 is shown along the jawline of the user. The second target zone 121 may include portions of the user's face above and under the chin of the user. The second target zone 121 may include portions of the user's face under the jawline of the user. The second target zone 121 may be used to measure electrical signals associated with muscles in the face, lips jaw and neck of the user, including the depressor labii inferioris of the user, the depressor anguli oris of the user, the mentalis of the user, the orbicularis oris of the user, the depressor septi of the user, the mentalis of the user, the platysma of the user and/or the risorius of the user. Various sensors may be placed at the second target zone 121. For example, electrodes (e.g., 111 in FIG. 1A) supported by the wearable device 100 (e.g., via a sensor arm 110) may be positioned to contact the second target zone 121. Additional sensors, e.g., accelerometers, may be supported by the wearable device and positioned at the second target zone 121 to measure the movement of the user's jaw. Additional sensor may also include sensors configured to detect the position and activity of the user's tongue.

In some embodiments, a third target zone 122 is shown at the neck of the user. The third target zone 122 may be used to measure electrical signals associated with muscles in the neck of the user, e.g., the sternal head of sternocleidomastoid of the user, or the clavicular head of sternocleidomastoid. Various sensors may be positioned at the third target zone 122. For example, accelerometers may be supported at the third target zone to measure vibrations and movement generated by the user's glottis during speech, as well as other vibrations and motion at the neck of user 101 produced during speech.

In some embodiments, a reference zone 123 may be located behind the ear of the user at the mastoid of the user. In some embodiments, reference electrodes (e.g., 114 in FIG. 1A) may be positioned to contact the reference zone 123 to supply a reference voltage to the face of the user, as discussed herein. Reference zone 123 may also include portions of the user's head behind and above the ear of the user.

With reference to FIGS. 1A and 1B, as discussed with reference to multiple target zones for measuring the user's speech muscle activation patterns associated with the user speaking, the wearable device 100 may include various mechanisms to adjust the positions of sensors for accommodating one or more target zones. For example, the sensor arm (e.g., 110) of the wearable device 100 may be adjustable along the axis of the sensor arm to enable the electrodes (e.g., 111 in FIG. 1A) on the sensor arm to align with a target zone. In some embodiments, one or more parts of the wearable device 100 may be moveable laterally, for example, to enable the sensor(s) thereon to be closer or further away from the user's body part (e.g., face or neck). In some embodiments, the wearable device 100 may include multiple sensor arms wearable on both sides of the face to enable multiple sets of sensors on either or both sides of the face or neck. It is appreciated that other suitable configurations may be possible to enable any sensors to be suitably positioned in respective target zones.

Figure 2:
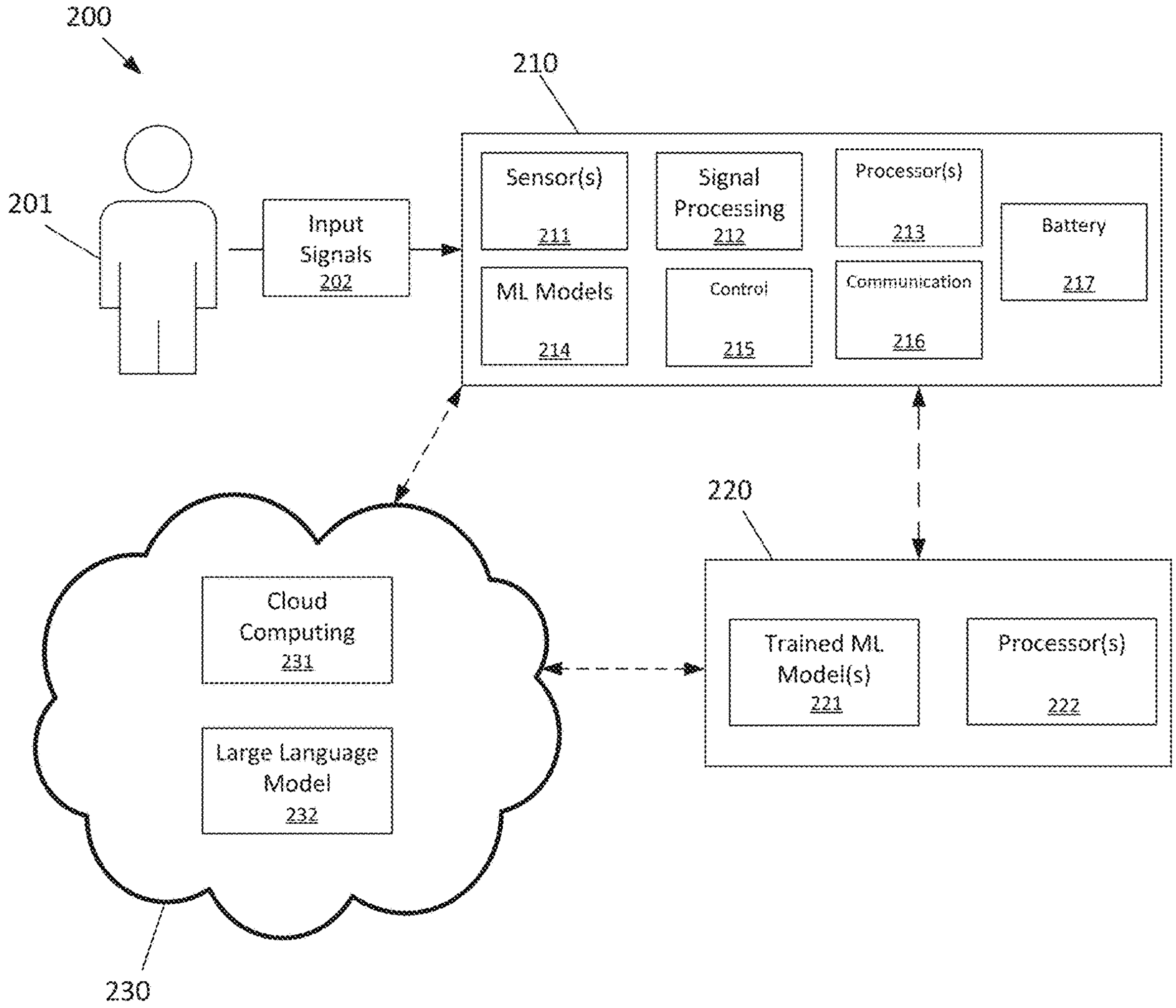
FIG. 2 is a block diagram of a silent speech system 200, in accordance with some embodiments of the technology described herein.

FIG. 2 is a block diagram of a silent speech system 200, in accordance with some embodiments of the technology described herein. The silent speech system 200 may include a wearable device 210 configured to signals 202 of a user 201, an external device 220 configured to determine words or phrases from signals 202 recorded by the wearable device, and a server 230. The signals 202 may include signals associated with silent speech or voided speech, as described herein.

Specific modules are shown within the external device 220 and server 230, however these modules may be located within any of the wearable device 210, external device 220 and server 230. In some examples, the external device 220 may contain the modules of the server 230 and the wearable device 210 will communicate directly with the external device 220. In some examples, the server 230 may contain the modules on the external device 220 and the wearable device 210 will communicate directly with the server 230. In some examples, the wearable device 210 may contain the modules of both the external device 220 and the server 230 and therefore the wearable device 210 will not communicate with the external device 220 or the server 230 to determine one or more words or phrases from the signals 202 recorded by the wearable device. In some examples some modules of the server 230 and external device 220 may be included in the server 230, external device 220 and/or the wearable device 210. Any combination of modules of the server 230 or external device 220 may be contained within the server 230, the external device 220 and/or the wearable device 210.

The wearable device 210 may include one or more sensors 211 which are used to record signals 202 form a user. The sensors 211 may include EMG electrodes for recording muscle activity associated with speech, a microphone for recording voiced and/or whispered speech, an accelerometer or IMU for recording vibrations associated with speech and other sensors for recording signals associated with speech. These other sensors may measure a position of a user's tongue, blood flow of the user, muscle strain of the user, muscle frequencies of the user, temperatures of the user, and magnetic fields of the user, among other signals, and may include: photoplethysmogram sensors, photodiodes, optical s sensors, laser doppler imaging, mechanomyography sensors, sonomyography sensors, ultrasound sensors, infrared sensors, Functional near-infrared spectroscopy (fNIRS) sensors, capacitive sensors, electroglottography sensors, electroencephalogram (EEG) sensors, and Magnetoencephalography (MEG) sensors, among other sensors.

The sensors 211 may be supported by the wearable device to record signals 202 associated with speech, either silent or voiced, at or near the head, face and/or neck of the user 201. Once recorded, the signals may be sent to a signal processing module 212 of the wearable device 210. The signal processing module 212 may perform one or more operations on the signals including filtering, thresholding, and analog to digital conversion, among other operations.

The signal processing module 212 may then pass the signals to one or more processors 213 of the wearable device 210. The processors 213 may perform additional processing on the signals including preprocessing, and digital processing. In addition, the processors may utilize one or more machine learning models 214 stored within the wearable device 210 to process the signals. The machine learning models 214 may be used to perform operations including feature extraction, and downsampling, as well as other processes for recognizing one or more words or phrases from signals 202. The processors 213 may process the signals to determine if the user is speaking silently or voiced and may determine one or more words or phrases from the signals and compare these words or phrases to known commands to determine an action the user wishes to perform. In some examples, additionally the processors may process the signals to determine if the user is preparing to speak.

After processing, signals may be sent to communication module 216, which may transmit the signals to one or more external devices or systems. The communication module 216 may perform one or more operations on the processed signals to prepare the signals for transmission to one or more external devices or systems. The signals may be transmitted using one or more modalities, including but not limited to wired connection, Bluetooth, Wi-Fi, cellular network, Ant, Ant+, NFMI and SRW, among other modalities. The signals may be communicated to an external processing device and/or to a server for further processing and/or actions.

The one or more external devices or systems may be any device suitable for processing silent speech signals including smartphones, tablets, computers, purpose-built processing devices, wearable electronic devices, and cloud computing servers, among others. In some examples, the communication module 216 may transmit speech signals directly to a server 230, which is configured to process the speech signals. In some examples, the communication module 216 may transmit speech signals to an external device 220 which processes the signals directly. In some examples, the communication module 216 may transmit speech signals to an external device 220 which, in turn, transmits the signals to server 230 which is configured to process the speech signals. In some examples, the communication module 216 may transmit speech signals to an external device 220 which is configured to partially process the speech signals and transmit the processed speech signals to a server 230 which is configured to complete the processing of the speech signals. The wearable device 210 may receive one or more signals from the external device or the cloud computing system in response to any transmitted signals.

Wearable device 210 may also include control component 215, which is configured to control the other components within the wearable device 210 based at least in part on the signals 202 and the processing performed by signal processing module 212, and processors 213. For example, the control component 215 may function to select sensors 211 for recording of signals, select subsets of a particular sensor such as electrodes for recording, change one or more modes of the wearable device 210, change one or more states of the wearable device 210, activate one or more modules of the wearable device 210 in response to an activation signal or signals, and control the recording of signals among other functions. In some examples the control component 215 may be configured to activate the signal processing module and processors in response to signals recorded by one or more of sensors 211. The control component may activate or device components based on signal indicative of one or more particular words, phrases or actions, which are recognized by the wearable device 210. Such signals may be recognized by the signal processing module 212, processors 213, and/or by using the machine learning models 214.

The external device may contain one or more trained ML models 221 and processors 222. The processors may be configured to recognize one or more words or phrases from the signals received from wearable device 210. The processors may then execute one or more actions on the external device based on the determined words or phrases. For example, applications and functions of the wearable device may be controlled, text inputs may be provided to the external device and communication may be supported by the external device using the signals received from the wearable device, among other actions.

In some examples, the processors 213 of the wearable device 210 may be configured to recognize one or more words or phrases from the recorded signals. The processors may use ML models 214 to recognize the one or more words or phrases. The processors of the wearable device 210 may then execute one or more actions on the wearable device or communicate actions to the external device based on the determined words or phrases. For example, applications and functions of the wearable device may be controlled, text inputs may be provided to the external device and communication may be supported by the external device using the signals received from the wearable device, among other actions. The wearable device may be powered by a battery such as battery 217.

The processors may utilize trained ML models 221 to recognize words or phrases from the signals received from the wearable device 210. The ML models may be structured in any suitable way, such as those described in in U.S. patent application Ser. No. 18/338,827, titled "WEARABLE SILENT SPEECH DEVICE, SYSTEMS, AND METHODS", filed Jun. 21, 2023, the entirety of which is incorporated by reference herein.

The external device 220 may communicate with server 230 to perform one or more actions. The external device 220, and server 230 may be connected via a common network. The server may include cloud computing components 231 to facilitate the connection and communication and a large language model (LLM) 232. The LLM 232 may be used to process words or phrases identified from the speech signals and to determine an action to be performed based on the words or phrases.

Figure 3:
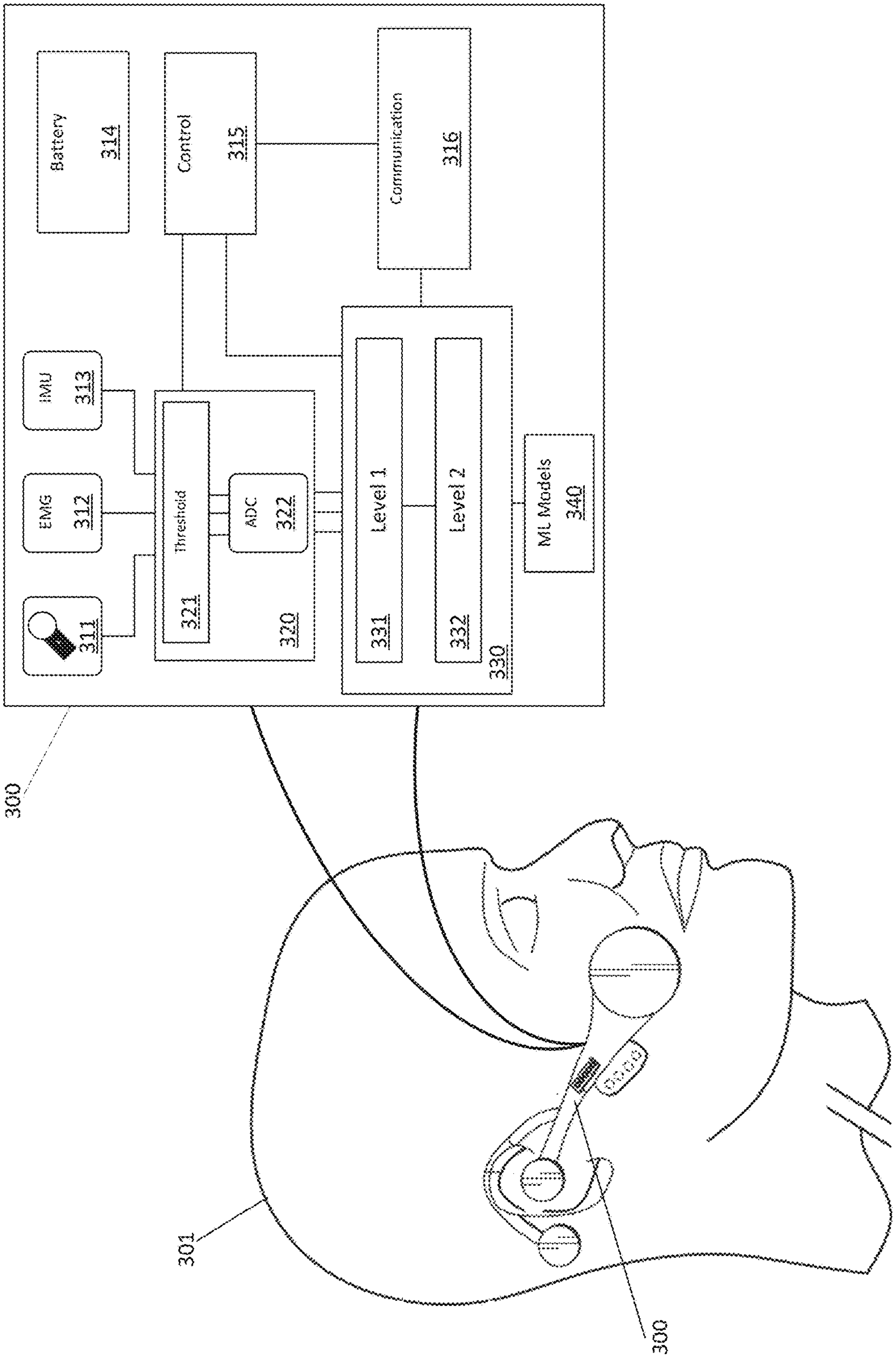
FIG. 3 is an example of a wearable device and components which may be used in the control and operation of the wearable device, in accordance with some embodiments of the technology described herein.

FIG. 3 is an example of a wearable device and components which may be used in the control and operation of the wearable device, in accordance with some embodiments of the technology described herein. Wearable device 300 is an ear-hook wearable device as discussed with relation to FIG. 1A, however any suitable embodiment of the wearable device may be used. The wearable device includes sensors to measure signals from the user 301. The sensors include microphone 311 configured to measure sounds associated with voiced speech, EMG sensor 312 configured to measure muscle activity associated with speech, and IMU 313 configured to measure vibrations associated with voiced speech. The wearable device 300 may include greater or fewer sensors in other examples. For example, the wearable device may include a microphone and EMG sensors, just EMG sensors, a microphone and an IMU, EMG sensors and an IMU, and any combination of these sensors and other sensors as discussed herein.

Wearable device 300 also includes battery 314, control component 315 and communication component 316. The control component 315 may control the activation of processing components including signal processing component 320 and processors 330, as well as the activity of communication component 316.

Processing components of the wearable device 300 include signal processing components 320 and processors 330. The processing of the device discussed with relation to FIGS. 3, 4A-D, 5 and 6 relates to the processing required for the control of the device components by a control component such as control component 315, however additional processing may be performed by the wearable device to facilitate the recognition of words or phrases from the signals or the performing of actions by the wearable device or connected devices. Such additional processing may additionally or alternatively include filtering of recorded signals, such as analog filtering of the signals. The analog filtering may include any suitable filter including a high-pass filter, a lowpass filter, a bandpass filter, a moving average filter, a band stop filter, a Butterworth filter, an elliptic filter, a Bessel filter, a comb filter, and a gaussian filter, among other suitable filters. The analog filters may be implemented as circuitry within the wearable device.

Signal processing components may include a threshold detection component 321 and an analog to digital converter (ADC) 322. The threshold detection component 321 may determine if signals received from the microphone 311, EMG sensors 312 or IMU are above or below a threshold signal level and may output signals indicative of which signals are above and/or below the threshold. The threshold detection component 321 may be implemented in a variety of ways, for example as a high pass filter, as a bandpass filter, as a low pass filter, as a diode, or in any other suitable way. In some examples, combinations of different implementations may be used for the threshold detection component, for example a bandpass filter may be applied to signals to remove artifacts, followed by a high pass filter or a lowpass filter to determine if the signal is above or below a respective threshold. The threshold detection component 321 may be connected to control component 315. Control component 315 may determine based on the output of the threshold detection component 321 whether additional processing should occur. If the control component 315 determines that additional processing is necessary, additional processing components may be activated.

The threshold detection component 321 allows the wearable device to differentiate between signals with small magnitudes associated with minor movements of the face which may occur as a result of breathing, chewing, scratching, facial expressions, and blinking, among other actions, and signals with larger magnitudes which are more likely to indicate the user 301 is speaking.

The threshold detection component 321 may function to determine whether the user is silently speaking or speaking out loud based on the signals recorded by sensors including microphone 311, EMG sensor 312 and IMU 313. For example, if the signals received from the microphone 311, EMG sensor 312 and IMU 313 are all above their respective thresholds, the threshold detection component 321 may determine the user is silently speaking, as the microphone 311 detects the voice of the user, the EMG sensor 312 detects the muscle activity associated with the user speaking and the IMU detects vibrations generated during voiced speech. In situations where only the EMG sensor 312 is above a threshold, the device may determine the user is silently speaking as the microphone 311 would not detect sounds associated with voiced speech and the user would not produce vibrations which would be detected by the IMU.

In some examples, the threshold detection component 321 may additionally function to determine whether the used is preparing to speak, based on whether signals recorded by the EMG sensor are above a threshold level.

In some examples, the microphone 311 may include multiple individual microphones. The wearable device may perform beamforming of the signals from the individual microphones to amplify or isolate sounds produced from a location corresponding to the user's mouth. The beamforming of signals produced by multiple microphones in order to generate the output signal for microphone 311, may reduce signal noise associated with sounds other than the user's voice. In some examples, the beamforming may determine a voice level within the microphone 311 signal, indicative of the level of user speech, based on the amplified or isolated sounds from around the user's mouth. In some examples, the user voice level may be compared to a threshold voice level, and the threshold detection component 321 determines the threshold of the microphone based on the determined voice level of the user instead of sounds from the environment the user is in.

In some examples, beamforming may not be performed on signals from the microphone 311 or the environment of the user may be too loud to completely eliminate outside noise from the beamformed signals. In such cases, the IMU 313 may be used to determine if the user is silently speaking or speaking out loud. If the microphone 311. EMG sensor 312 and IMU 313 signals are all above the respective thresholds, it may be determined the user 301 is speaking out loud because the vibrations associated with voiced speech are recorded by the IMU 313. The IMU 313 may record signals associated with glottal vibrations produced during voiced speech, as discussed herein. If the microphone 311 and EMG sensor 312 signals are above respective signals and the IMU 313 signal is below the respective threshold, it may be determined that the user is silently speaking because vibrations associated with voiced speech are not being produced and the signals recorded by the microphone may be associated with a noisy environment.

In some examples, the threshold detection component 321 may analyze the magnitude of the received signals and the duration of the signals to determine if the signals are above a respective threshold. For example, a signal recorded by a sensor of the wearable device 300 may be analyzed by the threshold detection component 321. The threshold detection component 321 may determine the magnitude of the signal is above a set level associated with the specific signal type and/or sensor. The threshold detection component 321 may then monitor the magnitude of the signal and determine the signal is above the set level if the magnitude of the signal remains above the level for a set amount of time. For example, if the magnitude of the signal remains above the set level for 0.5 seconds, 1 second, 2 seconds, 3 seconds, 4 seconds, 5 seconds or any other suitable amount of time, the threshold detection component 321 may determine the signal is above the set level. In some examples, the magnitude of the signal may increase above the set level, however, may drop below the level before the set amount of time has passed. In such examples, the threshold detection component 321 may determine the signal is not above the threshold. In some examples, the threshold detection component 321 may determine whether the signal is above the respective threshold based on the average value of the signal. In such examples, if the average value of the signal remains above the set value for the set amount of time, the threshold detection component may determine the signal is above the respective threshold.

These additional processing components may include processor 330 and ADC 322. The ADC may be activated and convert analog signals recorded from the sensors to digital signals for additional processing. The ADC may pass signals to processor 330. The processor 330 may be configured as one or more processors. The processor 330 may perform one or more levels of processing. For example, as shown the processor includes level 1 processing 331 and level 2 processing 332. The level 1 processing 331 may require less power than the level 2 processing 332 in order to operate.

The processor 330 may function to determine if the recorded signals are associated with the user speaking, either silently or voiced, based on if the user has spoken one or more known words or phrases, if the user has performed one or more known actions and/or the words or phrases spoken by the user. In some examples the processor 330 may additionally function to determine if the recorded signals are associated with the user preparing to speak, for example based on if the user has performed one or more known or recognized actions. In some examples, the different levels of processing within processor 330 may have different functions. For example, the level 1 processing 331 may function to determine if the user is speaking either silently or voiced and the level 2 processing may function to determine if the user spoke one or more known words or phrases, performed one or more known actions or the words or phrases spoken by the user. In some examples, the different levels of processing may have the same functions. For example, the level 1 processing 331 and level 2 processing 332 may both function to determine if the recorded signals are associated with the user speaking, either silently or voiced, if the user has spoken one or more known words or phrases, if the user has performed one or more known actions and/or the words or phrases spoken by the user. Any combination of processing functions may be performed by any level of processing within processor 330.

In some examples, the level 1 processing 331 and level 2 processing 332 may function to determine if the user is speaking or if the user is preparing to speak. The processing, including level 1 processing 331 and level 2 processing 332 may analyze the signals recorded by sensors of the device to determine if the user has performed one or more actions associated with them preparing to speak. Such actions may include the user positioning their tongue in a particular manner, the user positioning their jaw in a particular way, the user inhaling, the user positioning their head, the user opening their mouth or jaw, the user tensing speech articulator muscles, and the user clearing their throat among other actions indicating the user is preparing to speak. These actions may be recognized by level 1 processing 331 and/or by level 2 processing 332, as described herein.

In some examples, the level 1 processing 331 may involve simpler processing than the second level, level 2 332. For example, the first level of processing may include template matching of the received signals to one or more known signals. The one or more known signals may be recorded by the user 301 using the wearable device 300 and stored for later use. The known signals may be associated with a particular word, phrase, expression, or action the user performs. The first level of processing may additionally or alternatively involve using pattern recognition to analyze the signals. The pattern recognition may involve comparing the received signals to known signals or determining one or more features of signals and comparing these features to know signal features associated with particular words, phrases, expressions and/or actions the user may perform. The known signals or features may be predetermined based on recordings from the user or others, using a wearable device such as wearable device 300. The level 1 processing 331 may output one or more signals indicative of a degree of matching between the processed signals recorded from the user 301 and the known signals or signal features. The control component 315 may analyze the outputs of the level 1 processing 331 to determine actions to perform, such as activating level 2 332 of processing or activating communication component 316.

The second level of processing may be more intensive than the first level. Level 2 may involve using one or more trained machine learning (ML) models 340 stored within the wearable device to analyze the signals. The one or more ML models may be used to determine one or more words or phrases spoken silently or voiced by the user. In some examples, the one or more trained ML models may include a trained neural network, such as a convolutional neural network. The trained neural network may be configured to recognize words or phrases or known actions from the recorded signals. The neural network may be a trained convolutional neural network. The ML models may be trained on speech data recorded using a wearable device such as wearable device 300, or other mobile devices as described herein. The training data may include data recorded from EMG sensors, microphones, and IMUs, and may be tagged with known words, phrases or actions which were spoken or performed during the recordings. In some examples, the level 1 processing 331 may implement a ML model.

In some examples, the level 2 processing 332 may perform natural language processing on determined words or phrases to determine an action to be performed by the wearable device. The natural language processing may involve comparing the words or phrases to a set of words or phrases maintained by the device which are associated with different actions. The level 2 processing 332 may provide outputs to the control component 315, which may determine one or more actions to perform, as discussed herein.

In some examples, the level 1 processing 331 involves processing fewer signals than the level 2 processing. For example, the level 1 processing may process signals from a subset of the sensors on the device, such as processing only the signals recorded from the microphone 311 and EMG sensors 312, while the level 2 processing may additionally process the signals from the IMU 313, and/or any other sensors on the wearable device 300. In some examples, the sensors of the mobile device may include multiple channels or multiple sensors. For example, the microphone 311 may include multiple microphones, such as at least 2, at least 3, at least 4 at least 5 or at least 10 microphones. Additionally, the EMG sensor 312 may include multiple electrodes capable of recording EMG signals from the user, for example the EMG sensor may include at least 5, at least 10, at least 20 or at least 50 electrodes. During the level 1 processing 331, a subset of the individual sensors of each of the sensors may be analyzed. For example, if the EMG sensor 312 includes 10 electrodes, 3 of the electrodes may be used in the level 1 processing 331. The level 2 processing 332 may analyze signals from a larger subset of individual sensors of each sensor than the level 1 processing 331 or may analyze signals from all of the individual sensors.

In some examples the ADC 322 may operate differently for the level 1 processing 331 and the level 2 processing 332. For example, the ADC 322 may operate at a lower sampling frequency for level 1 processing 331, and a higher sampling frequency for level 2 processing 332. The lower sampling frequency will result in less data being analyzed during the level 1 processing 331 and therefore will require less power to perform the analog to digital conversion and to perform the level 1 processing 331. The lower sampling frequency used for level 1 processing 331, may result in the loss of data, and therefore additional processing may be performed, such as level 2 processing 332. A portion of the data lost from the lower sampling frequency used for level 1 processing 331 is present in the data output from the ADC 322 when using the higher sampling frequency. In some examples, the lower sampling frequency may be below 50 Hz, between 50-100 Hz, between 50-150 Hz, or between 100-500 Hz. In some examples, the lower sampling frequency may be 50 Hz, 75 Hz, 100 Hz, 150 Hz or 200 Hz. In some examples, the higher sampling frequency may be above 500 Hz, between 500-1 KHz, between 750-1.5 KHz, between 1-5 KHZ, between 1-10 KHz, between 1-20 KHz, between 1-50 KHz, between 16-44 KHz or above 50 KHz. In some examples, the higher sampling frequency may be 750 Hz, 1 KHz, 1.5 KHz, 2 KHz, 16 KHz, and/or 44 KHz. In some examples, signals from different sensors may be sampled at different frequencies. In such cases, different lower and higher sampling frequencies may be used for signals from different sensors. For example, signals from a microphone may be sampled at a first lower and a first higher sampling frequency, signals from an IMU may be sampled at a second lower and a second higher sampling frequency, different from the first sampling frequencies, and the EMG signals may be sampled at a third lower and a third higher sampling frequency, different from the first and second frequencies. In some examples, all signals may be sampled at the same frequencies. In some examples, examples some signals may be sampled at same frequencies, while others are sampled at different frequencies. In some examples, signals from different sensors may be sampled at a same lower sampling frequency and different higher sampling frequencies. For example, the EMG signals, IMU signals and microphone signals may be sampled at a same lower sampling frequency, and the EMG signals and IMU signals are sampled at a first higher sampling frequency and the microphone signals are sampled at a second higher sampling frequency, different from the first higher sampling frequency. In some examples, the EMG signals, IMU signals and microphone signals are sampled at a lower sampling frequency of 100 Hz, and the EMG signals and IMU signals are sampled at a first higher sampling frequency of 1 KHz and the microphone signals are sampled at a second higher sampling frequency between 16-44 KHZ.

In some examples the level 1 processing 331 may involve less intensive processing of signals, processing signals from fewer individual sensors, and processing of signals sampled at lower frequencies than the level 2 processing 332. In some examples, the level 1 processing 331 may involve only less intensive processing of signals than the level 2 processing 332. In some examples, the level 1 processing 331 may involve only processing signals from fewer individual sensors than the level 2 processing 332. In some examples, the level 1 processing 331 may involve processing of signals sampled at lower frequencies than the level 2 processing 332. In some examples, the level 1 processing 331 and level 2 processing 332 involve the same intensity of processing, such as both involving template matching, pattern recognition, and/or the use of machine learning models, on data collected from different numbers of sensors or data collected at different sampling frequencies. In some examples, any combinations of processing intensity, number of sensor signals processed, and sampling frequencies of processed signals may vary between different levels of processing within processor 330.

The control component 315 may function to lower power consumption of the wearable device by preventing the device from activating components when the components are not needed by the user. For example, the control component 315 may prevent components such as the ADC 322 or processor 330 from activating when the user is not intending to use the speech recognition or recording functionality of the wearable device. This will prevent unnecessary draining of battery 314 and will allow the user to continue the use of the device over extended periods of time without needing to remove the device for charging.

Components of the wearable device 300 including signal processing component 320, processor 330, control component 315, communication component 316 and ML models 340, among other components of the wearable device may be implemented in any suitable way. For example, these components may be implemented as separate components within the device. In some examples, these components may be implemented as separate hardware components within the device. In some examples, these components may be implemented as multiple software modules stored within storage of the wearable device. In some examples, these components may be implemented within a single software module within storage of the wearable device. In some examples, these components may be implemented as a combination of hardware and software within the wearable device.

Figure 4A:
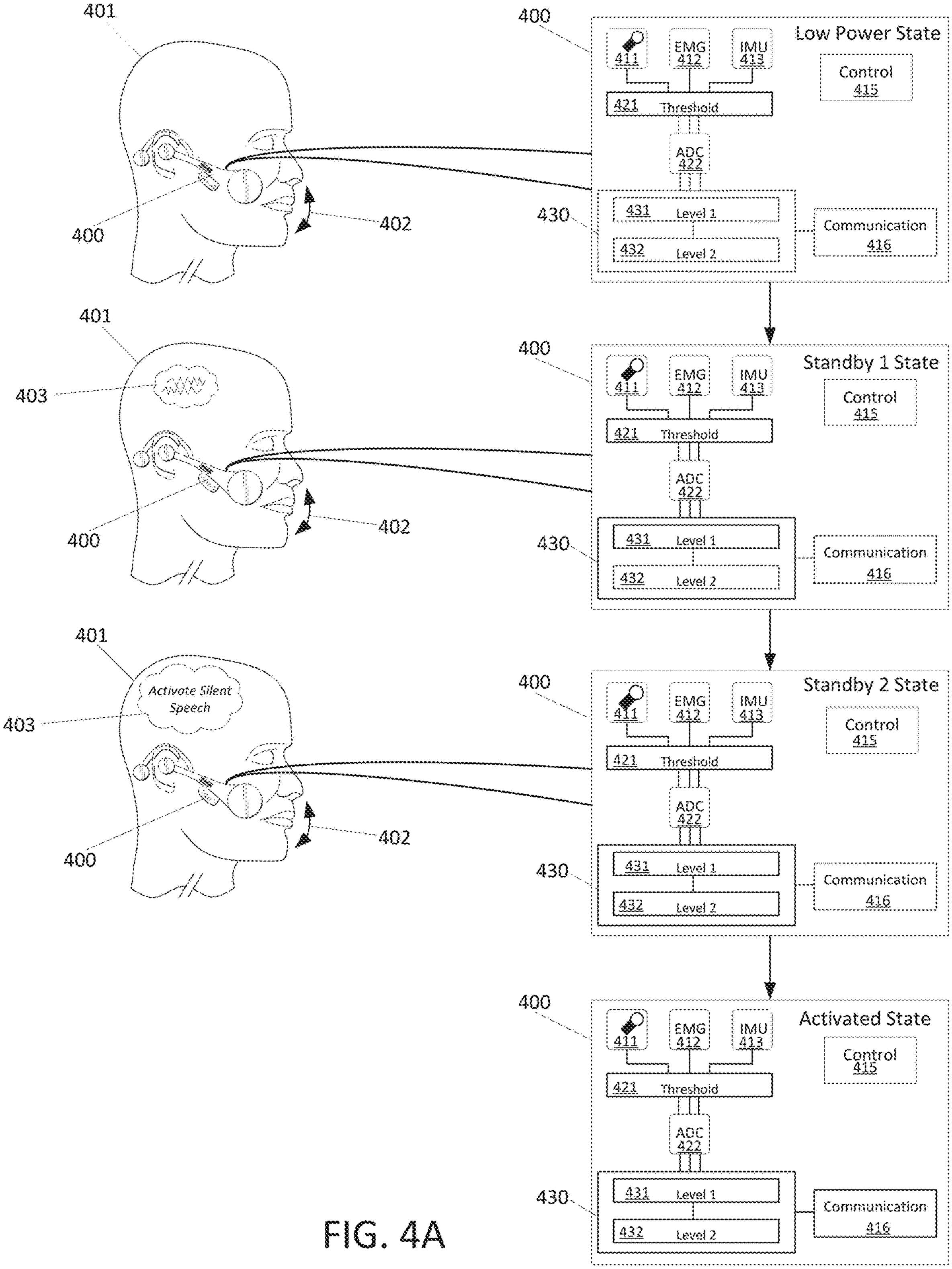
FIG. 4A illustrates an example process flow the wearable device may undergo in response to signals recorded from the user, in accordance with embodiments of the technology described herein.

FIG. 4A illustrates an example process flow the wearable device may undergo in response to signals recorded from the user, in accordance with embodiments of the technology described herein. The wearable device 400 records signals from the user 401 utilizing the microphone 411 configured to measure sounds associated with voiced speech, EMG sensor 412 configured to measure muscle activity associated with speech, and IMU 413 configured to measure vibrations associated with voiced speech. The user may silently speak one or more words or phrases, which generates signals which are recorded by the sensors.

The control component 415 may activate certain components of the devices in response to signals recorded by the sensors, including microphone 411, EMG sensor 412 and IMU 413. The components of FIG. 4A which are active are indicated by solid outlines and inactive components are indicated by dotted or dashed outlines. Active components may be receiving power and performing one or more associated functions. Inactive components may or may not be receiving power and are not performing any associated functions.

The wearable device may begin in a low power state with the sensors, including microphone 411, EMG sensor 412 and IMU 413, the control component 415 and the threshold detection component 421 being activated. During silent speech, the user 401 may move their mouth as indicated by arrow 402. The EMG sensor 412 may record signals associated with this movement, while the microphone 411 and IMU 413 may not record significant vibration, as the user is silently speaking. The signals recorded by the sensors may be sent to threshold detection component 421, which may determine the signals from the EMG sensor 412 are above a threshold level. The control component 415 may determine the user 401 is likely silently speaking based on the output of the threshold detection component 421. In some examples, the control component may change the state of the device directly to an activated state, by activating the communication component to begin transmitting the recorded signals to external devices, immediately after the signals are determined to be above the threshold. However, in the example shown in FIG. 4A, the control component activates the ADC 422 and level 1 431 of processor 430 and transitions the device to a standby 1 state. If signals above the respective thresholds are not recorded by the sensors, including microphone 411, EMG sensor 412 and IMU 413, the control component will not activate further processing and may remain in the current state until signals above a threshold are received or a signal to perform a different action is received.

As discussed herein, a processor may have multiple levels of processing which it may perform on the received signals, for example level 1 processing 431 and level 2 processing 432, which may perform the functions of level 1 processing and level 2 processing as discussed in FIG. 3. The different levels of processing may be performed by a single processor or multiple processors. The wearable device may have any suitable levels of processing, for example a single level of processing, three levels of processing, between 5 and 10 levels of processing of greater than 10 levels of processing. The different levels of processing may correlate with different states of the device, for example, the level 1 processing 431 may occur in a standby 1 state and the level 2 processing may occur in a standby 2 state. In some examples the different levels of processing may occur in the same state, and a state transition of the wearable device is not necessary to activate additional levels of processing.

The first level of processing 431 may involve less intensive processing than level 2 432 or may involve processing which requires less power than level 2 432. Level 1 431 may include template matching of the recorded signals to known signals or pattern recognition of the recorded signals to known signals. This processing may be to determine if the user 401 is speaking one or more known words or phrases or is performing one or more actions which can be recognized by the wearable device. The processing at level 1 431 may also confirm whether the user is silently speaking, speaking out loud, preparing to speak or performing a known action, or if the signals above threshold are due to another action of the user such as sneezing, coughing, chewing, and/or laughing, among other actions. As shown, the level 1 processing may recognize the signals from the user are associated with silent speech 403, however the words or phrases said by the user are not from the known words or phrases and therefore are not recognized at the level 1 processing. Additionally, or alternatively, the level 1 processing 431 may not be able to determine the source of the signals and therefore, additional processing may be performed to determine if the user is silently speaking or not.

The control component 415 may control the transition from level 1 processing 431 to level 2 processing 432, as discussed herein.

In some examples, the level 1 processing may determine a probability of whether the user is silently speaking or has performed a known action. If the probability is above a first threshold, for example above 70%, above 75%, above 80%, above 90%, or above 95%, the control component may directly transition the wearable device to the activated state. In some examples, if the level 1 processing determines the probability of the user silently speaking or having performed a known action is below the first probability, but above a second probability, for example above 30%, above 40%, above 50% or above 60%, the control component may activate the level 2 processing 432.

The control component 415 may analyze the results of the level 1 processing 431 and determine one or more actions to be performed. For example, the control component 415 may change the state of the device to the activated state by activating the communication component 416 to begin transmitting signals if a particular word, phrase or action is identified by level 1 processing 431. Alternatively, and as shown, the control component may activate level 2 processing 432 to further confirm the silent speech from the user, for example if the level 1 processing 431 determines recognizes silent speech, but not a particular word or phrase, or if the level 1 processing 431 determines a probability of the user silently speaking or having performed a known action is between a first and second probability. If level 1 processing 431 determines the output is not indicative of a recognized word, phrase, action or silent speech, the control component 415 may not perform any action and will keep level 1 processing activated. Additionally, or alternatively, after a threshold amount of time has passed, the control component 315 may deactivate level 1 processing 431, and ADC 422.

Level 2 processing 432 may be more intensive than level 1 processing and may involve the use of one or more ML models, as discussed herein. As shown, level 2 processing is performed when the device is in the standby 2 state. The level 2 processing 432 may function to determine one or more words or phrases from the signals recorded by the wearable device 400. As shown, the level 2 processing analyzes the signals and determines the silent speech 403 to state “Activate Silent Speech.” Based on this recognition of silently spoken words, the level 2 processing may additionally include performing natural language processing on the words to determine an action intended by the user. The level 2 processing may additionally or alternatively function to determine whether the signals are related to silent speech or are the result of another activity of the user. For example, continued coughing, sneezing and chewing, among other activities, may generate signals above a threshold, which cannot be recognized by the level 1 processing. Therefore, level 2 processing may be used to determine the source of the signals and an output may indicate whether the user is silently speaking or not. The level 2 processing may determine the signals are related to speech if transcription of words or phrases is output based on the signals. The determined words and phrases and/or action may be output to the control component which may perform an action based on the received outputs.

In some examples, the level 1 processing 431 may involve analyzing signals from a subset of the sensors of the wearable device. For example, the level 1 processing 431 may involve analyzing signals from a subset of the EMG electrodes of EMG sensor 412 or may involve analyzing signals recorded from only EMG sensor 412 and not from the microphone 411 or IMU 413. The level 2 processing 432 may then involve analyzing signals recorded from all electrodes of EMG sensor 412 or signals from additional sensors such as microphone 411 or IMU 413. In some examples, the level 1 processing 431 may analyze signals which have been sampled at a first frequency by ADC 422 and the level 2 processing 432 may analyze signals which have been sampled at a second frequency by the ADC 422, the second frequency being higher than the first frequency. Sampling at the higher frequency may require more power than sampling at the lower frequency. The control component 415 may control the sampling rate of the ADC when changing between level 1 and level 2 processing.

The level 1 processing and level 2 processing may involve any combinations as discussed herein. For example, the level 1 processing may involve processing a subset of electrodes of EMG sensor 412, at a lower sampling rate, while the level 2 processing may involve processing signals from all electrodes of EMG sensor 412 and at a higher sampling rate.

As shown the control component activates the communication component when the wearable device transitions to the activated state, such that the wearable device can transmit silent speech signals to external devices. In some examples, the control component may activate one or more other components of the wearable device when the device transitions to the activated state. For example, the control component may activate a processor of the wearable device to begin transcribing the one or more words or phrases spoken by the user. Transcribing the one or more words or phrases may include using one or more machine learning models to analyze signals recorded by the sensors of the wearable device. In some examples, the device may transcribe the words or phrases from the recorded signals and transmit the transcribed signals to a connected device in the activated state. In some examples, the wearable device may not transcribe the recorded signals and may transmit the recorded signals to a connected device for transcription in the activated state.

The control component 215 may determine from the output of level 2 processing 432, that the words or phrases are related to activating the silent speech function of the device and therefore wearable device is activated to begin transmitting data such that the silent speech functionalities may be used. The control component may also activate the wearable device if it is determined in the level 2 processing that the user is silently speaking. If the output of the level 2 processing 432 does not indicate that silent speech is occurring, or that the user did not speak words or phrases indicative of one or more actions, the control component may not activate the device or communication component 416 and may instead keep the level 2 processing active until an output indicates the user is silently speaking or silently spoke words or phrases associated with a particular action. Additionally, or alternatively, the control component 415 may deactivate level 2 processing 431, for example after a threshold amount of time has passed.

Figure 4B:
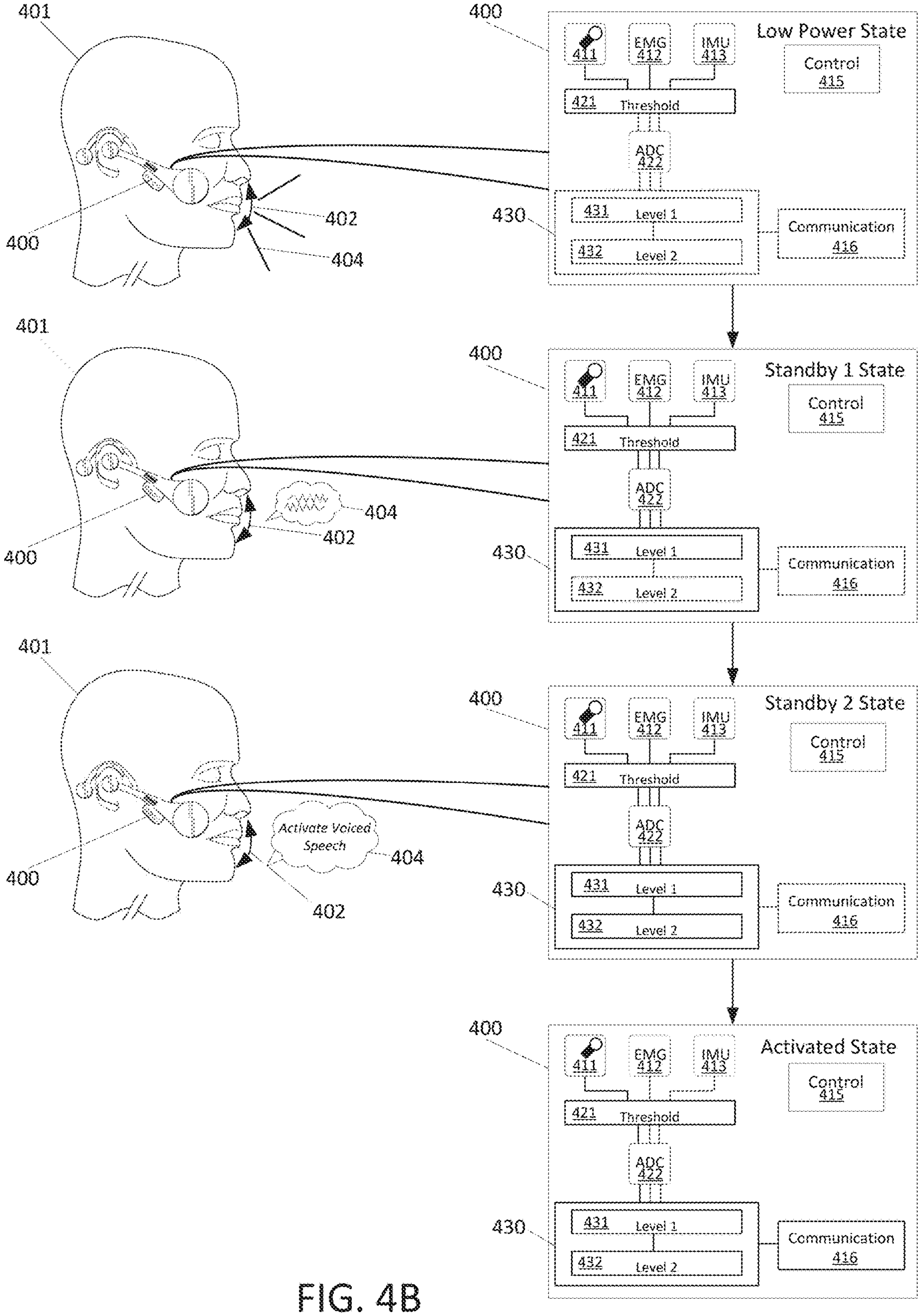
FIG. 4B illustrates an example process flow the wearable device may undergo in response to voiced speech signals recorded from the user, in accordance with some embodiments of the technology described herein.

FIG. 4B illustrates an example process flow the wearable device may undergo in response to voiced speech signals recorded from the user, in accordance with some embodiments of the technology described herein.

During voiced speech, the user 401 may move their mouth as indicated by arrow 402 and produce sounds indicated by sound 404. The microphone 411 may record the sound produced, EMG sensor 412 may record signals associated with the movement of the user’s face, and the IMU 413 may record signals associated with vibrations produced during speech. The signals recorded by the sensors may be sent to threshold detection component 421, which may determine the signals from the microphone 411, EMG sensor 412 and IMU 413 are all above a threshold level. The control component 415 may determine the user 401 is likely speaking out loud based on the output of the threshold detection component 421. Based on this output, the control component 415 may directly transition the device to the activated state by activating the communication component to transmit the voiced speech signals to external devices or transcribing the words or phrases spoken by the user, or may, as shown, activate additional signal processing and transition the wearable device 400 to the standby 1 state.

In response to the signals recorded by the microphone 411. EMG sensor 412 and IMU 413 sensors being over the respective thresholds, the control component may activate the level 1 processing 431, as discussed herein. As shown, the level 1 processing 431 recognizes sound 404 to be voiced speech, however particular words and phrases were not recognized, therefore the control component 415 activates level 2 processing 432 in the standby 2 state.

Level 2 processing 432 analyzes the recorded signals and determines that the words the user spoke were "activate voiced speech." The processing performed in level 2 processing may include analysis by a machine learning model and/or use of natural language processing to determine an action to perform based on the identified words and phrases, and other processes as discussed herein. The control component may determine based on the recognized words and phrases that the user intends to use the voiced speech functionality of the wearable device 400. In response, the control component 415 transitions the wearable device to the activated state by activating the communication component 416, which begins transmitting the recorded signals to external devices. In addition, the control component may put the wearable device into a voiced speech mode, in which components associated with voiced speech are activated and components not used for voiced speech are deactivated. As shown in FIG. 4B, the microphone 411 remains activated and the EMG sensor 412 and IMU 413 are deactivated. In some examples, instead of deactivating components when entering the voiced speech mode, the control component 415 may provide a signal to be communicated to external devices to enter the voiced speech mode, and the external devices may only analyze and/or process the signals from the microphone 411.

Figure 4C:
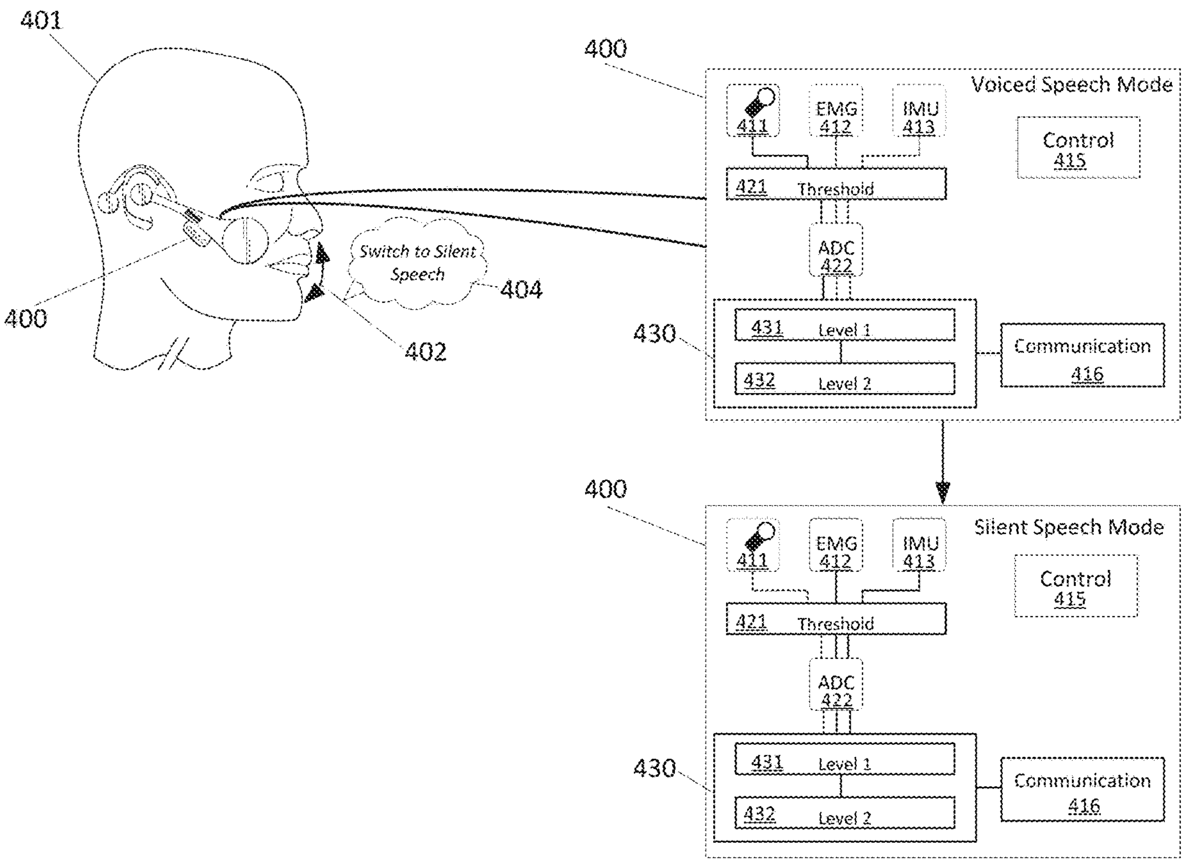
FIG. 4C illustrates a process flow for a silent speech device switching from a voiced speech mode to a silent speech mode, in accordance with some embodiments of the technology described herein.

FIG. 4C illustrates a process flow for a silent speech device switching from a voiced speech mode to a silent speech mode, in accordance with some embodiments of the technology described herein. As shown, the wearable device is in the activated state, and begins in a voiced speech mode with EMG sensor 412 and IMU 413 being deactivated. The EMG sensor 412 may be deactivated because the EMG signals are not needed to determine words or phrases spoken out loud. The IMU 413 may be deactivated because it is not necessary to determine the presence of vibrations associated with speech in the voiced speech mode, as the microphone records the sounds associated with speech. The microphone 411, threshold detection component 421, ADC 422, level 1 processing 431, level 2 processing 432, and communication component 416 are all activated. The user is shown speaking out loud, with sound 404 corresponding to the user saying, "switch to silent speech." These words spoken by the user may have been recognized by the processor 430, either by level 1 processing 431 or level 2 processing 432. The output indicating the user intends to switch the mode of the device to the silent speech mode is analyzed by the control component and the portions of the wearable device 400 corresponding to silent speech, including the EMG sensor 412, are activated, while the portions of the device corresponding to voiced speech, including microphone 411 and IMU 413, are deactivated. In some examples, a signal may be communicated to connected external devices indicating the user wishes to use the silent speech mode and the external device may, in response, begin processing the signals associated with silent speech and may no longer process signals associated with voiced speech.

In some examples, the wearable device may be configured to switch modes (e.g., to a silent speech mode or a voiced speech mode) in response to the user changing their method of speaking. For example, if a device is in voiced speech mode and determines the user has begun to speak silently the device may change to the silent speech mode. Similarly, if the device is in silent speech mode and determines the user has begun to speak out loud, the device may switch to the voiced speech mode.

Figure 4D:
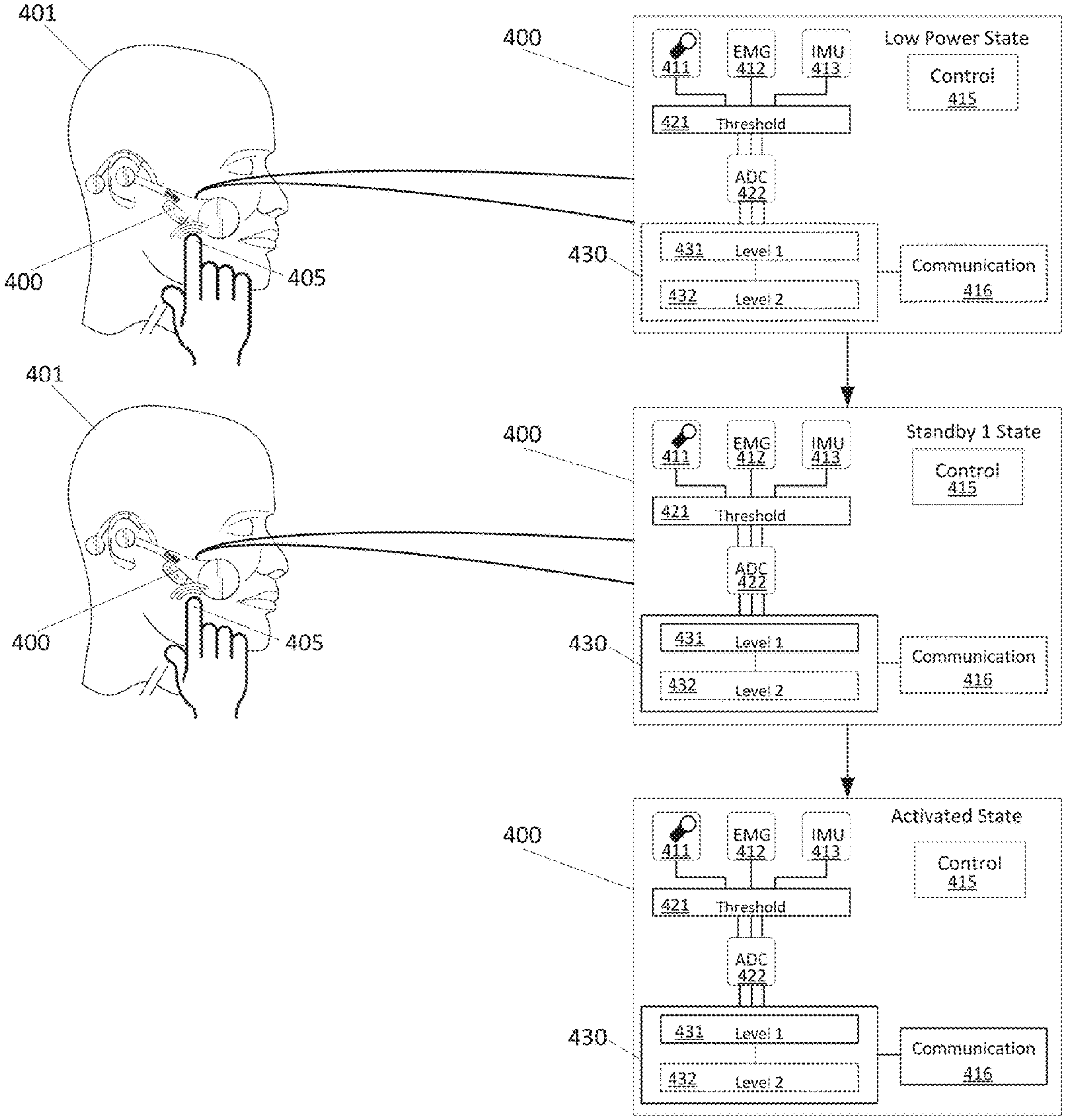
FIG. 4D illustrates an example process flow a wearable device may undergo in response to an action performed by the user, in accordance with some embodiments of the technology described herein.

FIG. 4D illustrates an example process flow a wearable device may undergo in response to an action performed by the user, in accordance with some embodiments of the technology described herein. As discussed here, the wearable device 400 may be configured to recognize actions performed by the user in order to activate certain components or functions of the device. As shown, the user taps their check, indicated by action 405, to activate the device. The taps on the cheek result in the threshold detection component 421 determining signals from the IMU 413 are above a threshold level due to vibrations generated from the tapping, which results in the control component 415 activating the ADC 422 and level 1 processing 431 in the standby 1 state. In some examples, actions performed by the user may be recognized by the EMG sensor 412, IMU 413, or both EMG sensor 412 and IMU 413. The level 1 processing 432 may match the received signals to a template signal for cheek taps and will output a signal indicative of this to the control component 415. Tapping the cheek may be associated with activating the device, and in response, the control component 415 activates the communication component 416 such that the wearable device 400 may transmit signals to one or more connected devices in the activated state in the activated state. In some examples, the control component may activate the device to transcribe the one or more words or phrases spoken by the user. In some examples, the wearable device may transmit the transcribed signals to a connected device in the activated state.

Figure 5:
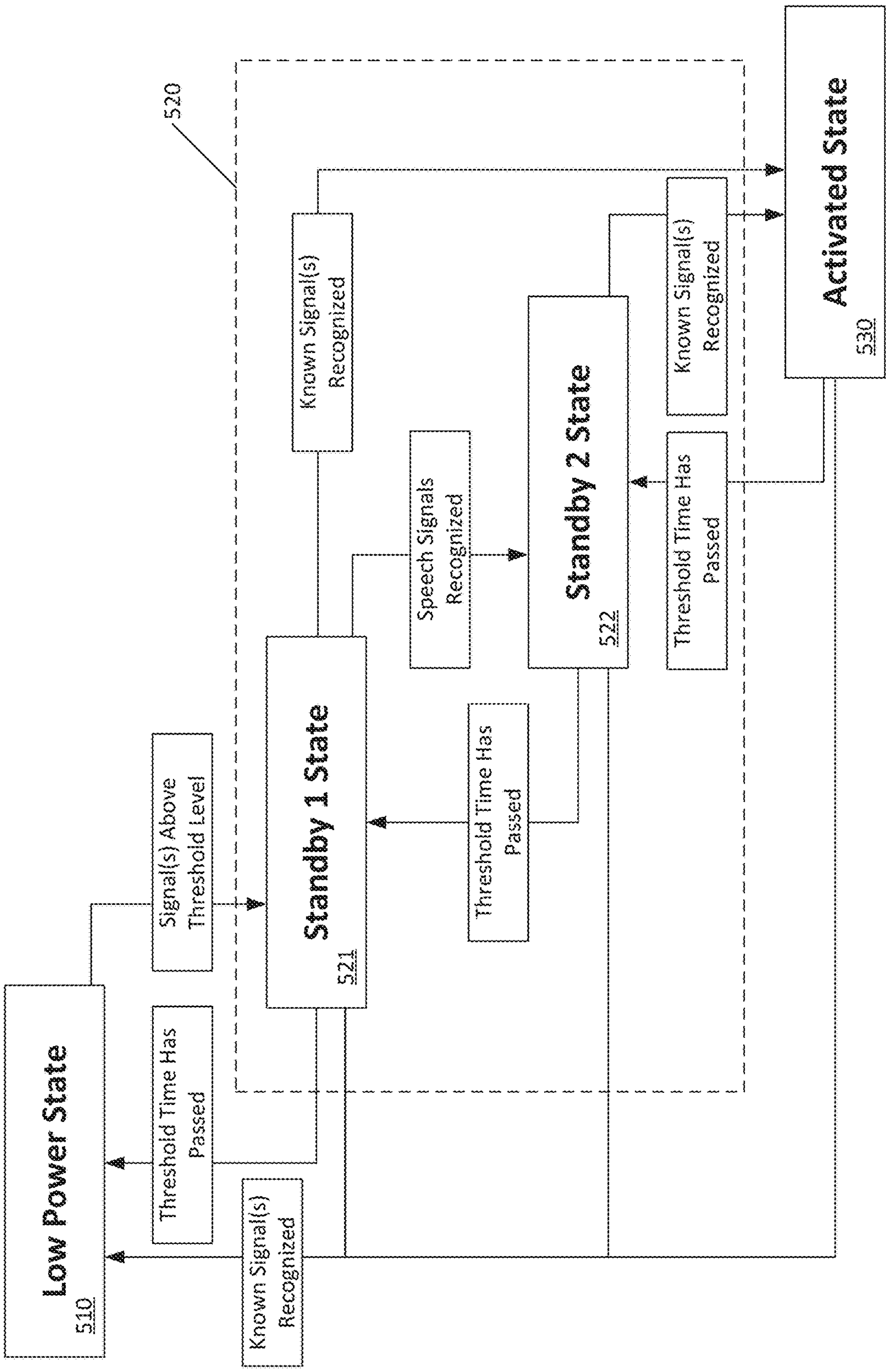
FIG. 5 provides a state transition diagram for a wearable device in accordance with some embodiments of the technology described herein.

FIG. 5 provides a state transition diagram for a wearable device in accordance with some embodiments of the technology described herein. As shown, the device may be in one of four different states, low power state 510, standby 1 state 521, standby 2 state 522, and activated state 530. Each state corresponds to different components or processes within the device being activated.

The low power state may have only the sensors or subset of sensors, such as the microphone, EMG sensors, IMUs and any other sensors, a threshold detection component such as 421 as discussed regarding FIGS. 4A-D, and a control component such as 415 as discussed regarding FIGS. 4A-D, activated. In the low power state 510, the wearable device may record signals and perform basic processing to determine if the user is speaking either silently or out loud. The low power state 510 reduces battery usage by the device in situations where the user is not intending to use the device. For example, the user may be working on a particular task and may take a short break to eat or drink. The device may enter the low power state 510 during the break and exit the low power state 510 in response to the user speaking after the break. This extends the battery life of the wearable device, allowing the user to continue benefitting from the silent speech functionality for longer periods of time.

The wearable device may switch to a standby state 520 in response to one or more of the recorded signals increasing to a level above a threshold level. As shown, standby state 520 includes two states, standby 1 state 521 and standby 2 state 522, however in other examples, greater or fewer standby states may be used. For example, 1 standby state, 3 standby states, 4 standby states, 5 standby states or a greater number of standby states may be used. The standby states 520 may involve a greater level of processing than the low power state 510, and therefore will require more power than the low power state 510, however do not require as much power as an activated state 530.

The standby 1 state 521 may involve processing such as template matching and pattern recognition, as discussed with reference to processing level 1 of FIGS. 4A-D. The processing may be to recognize a particular signal or action from a set of know signals or actions. For example, a user of the device may speak one or more words, phrases or actions which elicit a particular response in the wearable device. Non-limiting examples of words or phrases which the user may include, for example "silent speech." "start silent speech." "switch to silent speech." "begin silent speech." "turn on silent speech," among others to activate the device or switch the device to the silent speech mode; for example "voiced speech," "start voiced speech," "switch to voiced speech." "begin voiced speech," "turn on voiced speech," among others to activate the device or switch the device to the voiced speech mode; and/or for example tapping on the cheek a predetermined number of times to activate the device or change modes, such as twice for silent speech and three times for voiced speech, clicking the teeth a set number of times, making a particular facial expression and/or expressions, clenching the jaw, tapping a particular side of the face, or other actions or gestures which may be recorded and recognized by the sensors of the wearable device. In some examples, the processing may recognize actions performed by the user which are associated with the user preparing to speak, for example, the user positioning their tongue in a particular manner, the user positioning their jaw in a particular way, and the user inhaling, the user positioning their head, among other actions indicating the user is preparing to speak. If the device recognizes one of these particular words, phrases or signals in the standby 1 state 521, the control component may switch the state of the device to the activated state 530, in which the communication component of the device is activated and is transmitting recorded signals to one or more connected external devices.

If the processing in the standby 1 state 521 only recognizes the signals as speech signals, or recognizes the signals are likely to be speech signals above a threshold probability or between threshold probabilities, the device may then proceed to standby 2 state, as discussed herein. If the signals are not recognized as speech or as being associated with a known word, phrase or action, the device may remain in standby 1 state 521 until a threshold amount of time has passed, and then return to the low power state 510.

The standby 2 state 522 may involve higher level processing than the standby 1 state 521 and therefore may use more power than the standby 1 state 521. For example, the standby 2 state may perform processing associated with the level 2 processing of FIGS. 4A-D. The processing in the standby 2 state 522 may be to determine if known signals are recognized from the recorded signals. The wearable device may use ML models to determine words or phrases from the recorded signals and may perform natural language processing on the identified words or phrases to determine if the device should proceed to the activated state 530. The device may proceed to the activated state 530 if it is determined in the standby 2 state 522 that the recorded signals are associated with the user speaking words or phrases. In some examples, the device may proceed to the activated state 530 if it is determined in the standby 2 state 522 that the recorded signals contain one or more words or phrases and are associated with a particular action to be performed. The device may perform natural language processing on the one or more words or phrases to determine if they are associated with an action to be performed. If the words or phrases are associated with a particular action to be performed, the device will perform the action, such as switching to the activated state 530 and/or changing a mode of the device. In some examples, the device may proceed to the activated state in response to determining in the standby 2 state 522 that the user has performed one or more speech preparatory actions, indicating they are preparing to speak.

In the activated state 530, the device may record signals, and perform processing of the signals. In some examples, the wearable device may transcribe the words or phrases spoken by the user in the activated state. In some examples, the wearable device may transmit the recorded signals or transcribed signals to one or more connected devices in the activated state. In some examples, the processing performed in the activated state is different from the processing performed which controls the states of the device. In some examples, the recorded signals are transmitted directly to the external devices. In some examples, the wearable device remains paired or connected to the external devices in the low power state 510, and/or the standby state 520, however does not transmit data to the external devices. The activated state 530 requires more power than any of the low power state 510, standby 1 state 521, and/or standby 2 state 522, and it is therefore desirable to limit the amount of time the wearable device is in the activated state 530 when the user is not intending to use the functions of the wearable device. This will ensure the battery of the wearable device is conserved and will allow the wearable device to be worn continuously for longer periods of time, without the need for charging.

In some examples, the wearable device may provide an indication to users that a change in state or mode of the wearable device has occurred. For example, the wearable device may play a particular sound over the speaker such as a chime or tone or may play words over the speaker such as "device activated." In some examples, the wearable device may vibrate to indicate a change in mode or state of the wearable device has occurred. In some examples, the wearable device may activate one or more lights to visibly indicate a change in state or mode has occurred, for example a light may turn on or change color when the device is in the activated state. In some examples, the wearable device may transmit a signal to a connected external device, which results in a notification being displayed or otherwise provided by the external device that a change in state or mode of the wearable device has occurred. In some examples, an indication may be provided for all changes in state or mode of the device. In some examples, an indication may be provided only for changes which relate to the functions of the device, such as a change into the activated state, a change into the low power state, or a change to the voiced speech mode or silent speech mode.

In some examples, the wearable device may be configured to recognize a signal to cancel or stop an action. For example, a user may accidentally activate the activated state of the device or may decide they no longer want to change a state or a mode of the device. In such examples, the user may say a particular word or phrase such as "cancel." "undo," or "I didn't mean to do that," among other words or phrases, and/or may perform an action such as tapping their check or clenching their teeth, among other actions. In response, the wearable device may stop the change in state or mode of the device or may revert the device to the previous state or mode.

In some examples, the threshold for changing states varies according to the state the device is in, in order to reduce latency of the device and ensure swift activation of the device when the user is intending to use the device. For example, the threshold for advancing from the low power state 510 to the standby 1 state 521 may be relatively high compared to other thresholds. This threshold may be set at a relatively high level to prevent false positive activations from occurring, or instances where the user is not intending to activate the device, but the device still activates. This threshold may be determined by recording, with the wearable device, the user when speaking out loud and silently and when performing actions such as chewing, smiling, and frowning, among other actions. A comparison may be made between the recordings made during speaking and the recordings made during other activities, and the threshold may be determined based on the comparison. For example, a threshold maybe selected that ensures all speech recordings or activities associated with speech would result in a state change, while few or none of the other activities would result in a state change. In some examples, a threshold may be chosen such that most or a high percentage such as at least 65%, at least 70%, at least 80%, at least 90%, at least 95%, or at least 99% of the speech recordings result in a state change while few or none of the other activities result in a state change, for example at most 0%, at most 5%, at most 10%, at most 20%, at most 30%, or at most 40% of the other activities.

Relative to the threshold for change from the low power state, a change from the standby 1 state may have a lower threshold. Because the threshold for activation to the standby 1 state is relatively high, it is more likely that the user is intending to use the wearable device. Therefore, when determining whether the user is silently speaking or has spoken one or more know words or phrases or performed one or more known actions, the transition to standby 2 state may occur more often than the transition from the low power state to the standby 1 state. In some examples, the wearable device may utilize a machine learning model to analyze the signals recorded from the wearable device. In some examples, the machine learning model may output a probability distribution including a probability indicative of the likelihood the user has spoken one or more known words or phrases or performed one or more known actions. The state may change to the standby 2 state or the activated state if the probability the user has spoken one or more known words or phrases or performed one or more known actions is above a threshold probability. The threshold probability may be set such that many or most signals result in a state change. For example, the state may change to standby 2 state if the probability is above 10%, above 20%, 30%, above 40%, above 50%, above 60% or above 70%, while the state may change to the activated state if the probability is above 50%, above 60%, above 70%, above 80%, or above 90%.

In the standby 2 state, the machine learning model may also output a probability distribution of the likelihood the user is speaking words or phrases or has performed a speech related action. The state may change to the activated state if the probability of the user speaking words or phrases or having performed a speech related action is above a threshold probability. The threshold probability may be lower relative to the thresholds used for the transition to standby 1 state and or standby 2 state, because the signals have already been analyzed, for example the system may transition to the activated state if the probability is above 10%, above 20%, 30%, above 40%, above 50%, above 60% or above 70%.

The relative decrease in thresholds for the state changes to states which require additional power or processing, for example from the low power state, to standby 1 state, from standby 1 state to standby 2 state or activated state, and/or from the standby 2 state to the activated state, ensures the wearable device responds quickly to user inputs and avoids unnecessary delays in activation due to increased processing times. The relative thresholds may decrease because of the previous processing indicating the signals are likely associated with speech, and therefore the additional processing is used to confirm the results of the previous processing.

In some examples, the wearable device may comprise one or more input sensors, separate from the sensors used for recording signals associated with silent speech, such as inputs 115 of FIG. 1A. These inputs may include buttons, switches, sliders, capacitive sensors, and/or external device inputs such as clicking a key on a keyboard, or an input on a user interface, among other inputs. In some examples, a user may make an input to such input sensors, and in response the wearable device may change states. For example, a user may touch a capacitive sensor positioned on the wearable device, when the wearable device is in the low power state, and the wearable device may change to the activated state in response. The input sensors may also be used to turn a wearable device fully off from a powered state or to a low power state from an activated state. The input sensors may also be used to change a mode of the device, for example from a silent speech mode to a voiced speech mode. The wearable device may comprise multiple of such input sensors, and each of the input sensors may have a different function. For example, one input sensor may allow the user to toggle between silent speech and voiced speech modes, a second input sensor may be used for powering on and off the device and a third input sensor may be used for changing the state of the wearable device.

In some examples, the wearable device may include one or more components such as memory buffers to temporarily store signals recorded by the wearable device. The memory buffers may be implemented as hardware modules or may be implemented as software programs which store the data in a particular location within memory of the wearable device. The memory buffers may store data including signals, processed signals, and filtered signals. The memory buffers may always be activated and may store the signals recorded by the device for during a set amount of time. For example, the memory buffers may store the last 5 seconds of recorded signals, the last 10 seconds of recorded signals, the last 20 seconds of recorded signals, the last 30 seconds of recorded, or the last minute of recorded signals. The memory buffer ensures the content of signals, previously or currently being recorded, is not lost when the device is processing recorded signals. Therefore, if the device determines the user is speaking through processing in the low power state, standby 1 state, and standby 2 state, the signals recorded before and during the processing may be transmitted to connected devices for processing and analysis. The memory buffers may temporarily store all recorded signals, recorded signals above a threshold level, or signals recorded during the standby state.

The wearable device may also automatically change states from states requiring higher power to states requiring lower power. These transitions may occur from the recognition of known signals, after a threshold amount of time has passed, or from a user input to input sensors. The wearable device may change states to a lower power state after a threshold amount of time has passed since a particular action has occurred. For example, the threshold amount of time may be with relation to the wearable device has detected signals from the user, and/or the wearable device has detected speech signals from the user. Any suitable time threshold may be used, for example, up to 5 minutes, up to 4 minutes, up to 3 minutes, up to 2 minutes, up to 1 minute, up to 30 seconds, or up to 20 seconds. The wearable device may transition from the activated state to the standby 2 state, from the standby 2 state to the standby 1 state, and the standby 1 state to the low power state based on a threshold amount of time passing. The wearable device may also transition from the low power state to a fully off state based on a threshold amount of time passing. The threshold amount of time may vary based on the state the device is transitioning to or from.

The wearable device may also transition to lower power states based on known signals recognized from the signals recorded by the sensors of the wearable device. For example, the wearable device may store one or more known signals which are indicative of the user desiring to transition the device to the low power state. In some examples, the wearable device may store signals indicative of the user desiring to power off the device. The wearable device may recognize the signal when in one of the transmitting, standby 2, or standby 1 states, and may directly enter the low power state or power off in response to recognizing the signals. The signals may be associated with one or more known words or phrases or with one or more known actions. For example, the user may speak either out loud or silently "power off." "low power state," "switch to low power." and "turn off," among other words or phrases. The user may also perform a known action such as tapping their cheek a certain number of times or clenching their jaw, among other actions discussed herein. In some examples, the external device may recognize the known words, phrases or actions from the recorded signals when the device is in the activated state. The external device may transmit a signal to the wearable device that a known word, phrase or action was identified and the wearable device may transition states in response to the signal from the external device.

Figure 6:
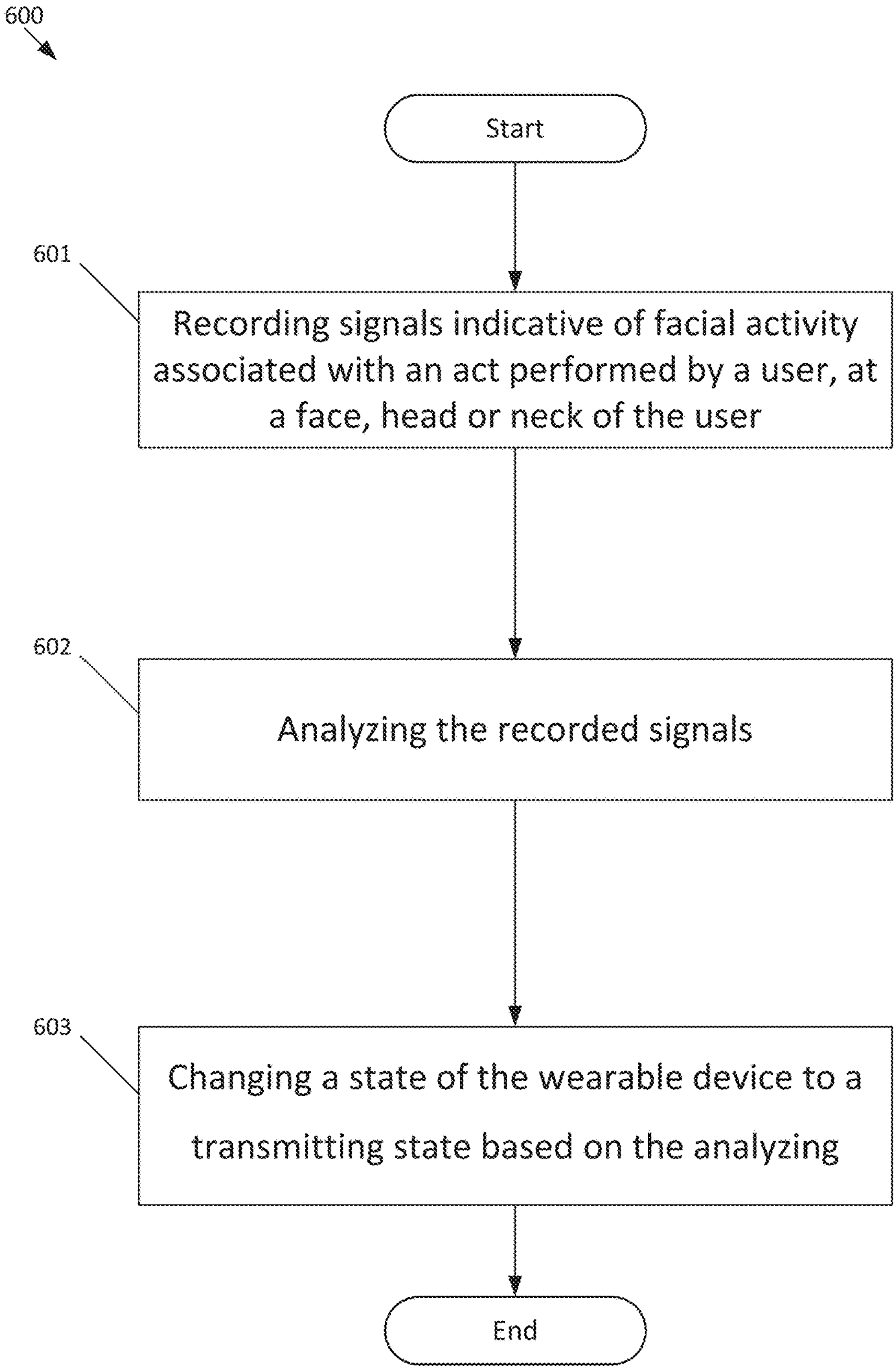
FIG. 6 is a flow chart of an illustrative process for activating a wearable device, in accordance with some embodiments of the technology described herein.

FIG. 6 is a flow chart of an illustrative process for activating a wearable device, in accordance with some embodiments of the technology described herein. Process 600 may be performed by a wearable device, such as wearable device 100 of FIG. 1A or other wearable devices as described herein.

Process 600 begins at step 601, which involves recording signals indicative of facial movement and actions performed by a user, at a face, head or neck of the user. The signals may be recorded using different sensors as described herein. For example, EMG sensors, microphones or IMUs may be used, as described with reference to FIGS. 3, and 4A-D. In some examples, additional sensors may be used, as described herein. The signals may be associated with a user speaking out loud, and/or silently, or may be associated with particular actions performed by the user such as tapping their check, and/or clenching their jaw, among other actions described herein.

Process 600 then proceeds to step 602, in which the signals recorded in step 601 are analyzed. The analysis of the signals may include analysis as described in FIGS. 4A-4D. For example, the analysis may include analyzing the signals to determine if the signals are above a threshold level, template matching of the signals to one or more known signals, and/or the use of machine learning models to determine words or phrases spoken by the user. The analyzing of step 602 may include multiple types of analyzing or a single type of analysis. The analyzing of step 602 may include changing the state of the device and/or activating different types of analysis in response to the analyzing. For example, the analyzing may include determining if the signals are above a threshold level, and in response to determining the signals are above the threshold level, additional processing may be performed such as template matching of the signals to known signals. Additional analyzing may be activated in response to the results of the template matching, for example ML models may be used to analyze the signals if the template matching results indicate additional analysis is required. In examples, where additional analysis is activated in response to previous analyzing results, different components of the device may be activated to support the additional analyzing. For example, an analog to digital converter, or one or more processors may be activated to support the additional analyzing and processing of the signals.

The analyzing may be performed in one or more states of the device, as discussed herein. The states of the device may correspond to the different types of processing and analysis which occurs in the state. For example, initial analyzing may occur in a low power state, while subsequent analyzing may occur in a standby state of the device.

Process 600 then proceeds to step 603, in which the state of the device is changed to an activated state in response to the results of the analyzing of step 602. Changing the device to the activated state may involve activating one or more components of the device such that the recorded signals may be transmitted to an external device which is connected to the wearable device. Changing to the activated state may involve using a communication component of the wearable device, as described with reference to FIGS. 3 and 4A-D. The communication component of the wearable device may perform actions such as the packaging, packeting, compressing and transmitting of signals to one or more external devices which are connected to the wearable device.

Other actions may be performed by the wearable device including changing the mode of the wearable device to a voiced speech mode or a silent speech mode. The wearable device may change to a silent speech mode when it is detected the user is speaking silently based on the recorded sensor signals, such as when the microphone and IMUs are below respective thresholds, and the EMG sensor is above the respective threshold. The wearable device may change to a voiced speech mode when it is detected the user is speaking out loud, for example when it is determined the EMG sensor, microphone and IMU are above respective thresholds. The wearable device may also change modes after determining the user has performed a known action, has spoken a known word or phrase associated with changing the mode of the device, and/or has spoken in instruction to change the mode of the device.

Changing the mode of the device in response to the results of the analyzing may involve activating or deactivating certain device components. For example, if the device is in the silent speech mode, the EMG sensors may be activated and the microphone and IMU may be deactivated. In some examples, when in the silent speech mode, the microphone and IMU may be activated while the signals recorded by the microphone and IMU are not analyzed or are partially analyzed. For example, the signals from the microphone and IMU may be analyzed by a threshold detection component, such as discussed with regard to FIGS. 3 and 4A-D, while additional analyzing such as template matching or using ML models may not be performed on the signals recorded by the microphone or IMU. In some examples, when in the voiced speech mode, the microphone may be activated, while the EMG and IMU are deactivated. In some examples, all sensors may be activated, however the processing of signals may vary, for example the microphone signals may undergo all analyzing as discussed herein, while the EMG and IMU signals may not be analyzed or may receive minimal analyzing such as only threshold analysis, while template matching and analysis with ML models is not performed.

Figure 7:
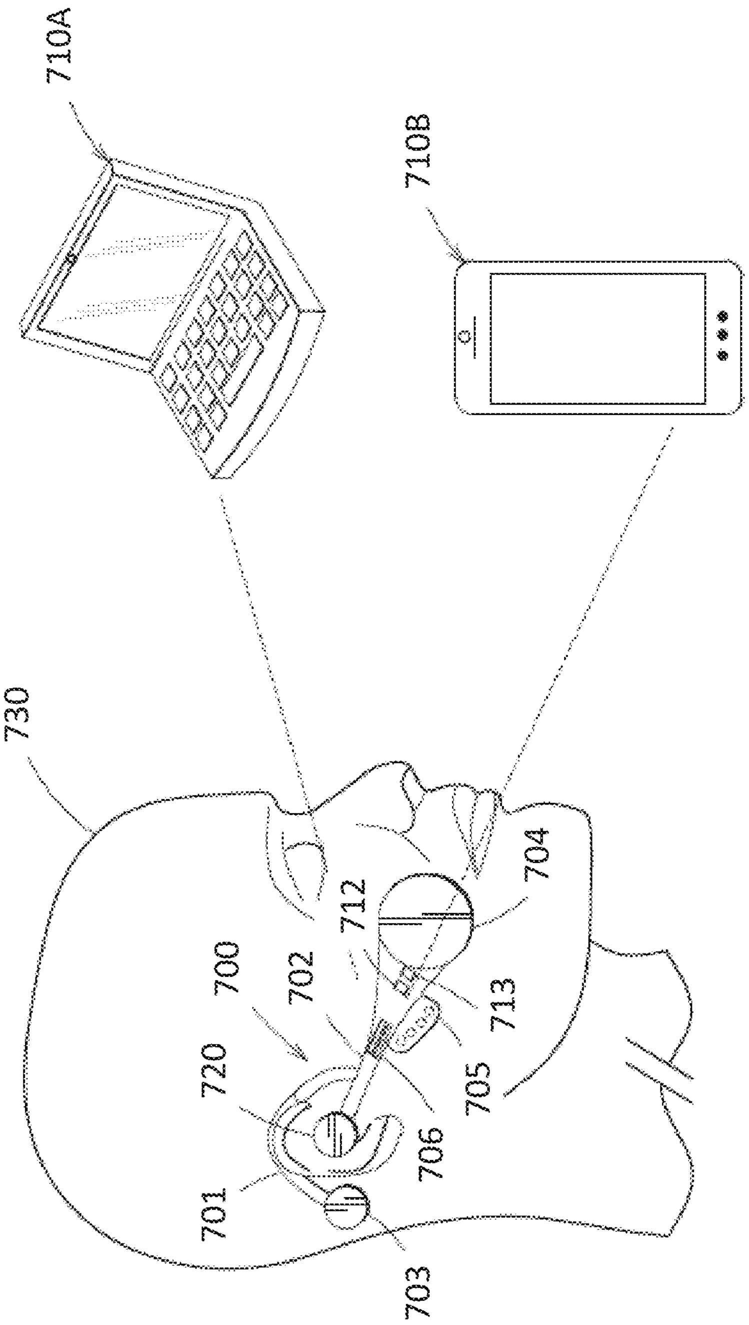
FIG. 7 illustrates a system in which a wearable device 700 is in communication with an external device, in accordance with some embodiments of the technology described herein.

FIG. 7 illustrates a system in which a wearable device 700 is in communication with an external device, in accordance with some embodiments of the technology described herein. Wearable device 700 may be similar in structure to wearable device 100 (FIG. 1A) and other wearable devices described herein, and have similar components, such as sensor arm 702, ear hook 701, speaker 720, one or more inputs 706, one or more sensors 705, one or more electrodes 704, reference electrodes 703, one or more processors 712, and optionally a speech model 713. In some embodiments, wearable device 700 may be configured to be in communication with one or more external devices, e.g., 710A, 710B, where the combination of the wearable device 700 and the external devices 710 may enable any suitable system that utilizes the silent speech from the wearable device.

In some embodiments, wearable device 700 may record silent and/or voiced speech signals of the user from the one or more sensors and transmit the text or encoded features of the user's speech (e.g., obtained from a speech model on the wearable device) to the external device, where the wearable device 700 has a build-in speech model. Alternatively, and/or additionally, the wearable device 700 may record silent and/or voiced speech signals of the user from the one or more sensors and transmit the signals (sensor data) to the external device, where the external device has a speech model to predict text or encoded features using the sensor data, and further provide the predicted text or encoded features to an application to take one or more actions. For example, the external device 710A or 710B may use the text or encoded features from the user's speech (e.g., via the speech model) to control one or more aspects of the connected the external device 710A or 710B. For example, the signals obtained from the one or more sensors (e.g., 711, 706) associated with the user's speech may be used to control a user interface of the connected external device, to control an application of the device, to provide an input to the device, to retrieve information from the device or to access or control one or more additional functions of the device, as discussed herein.

Figure 8:
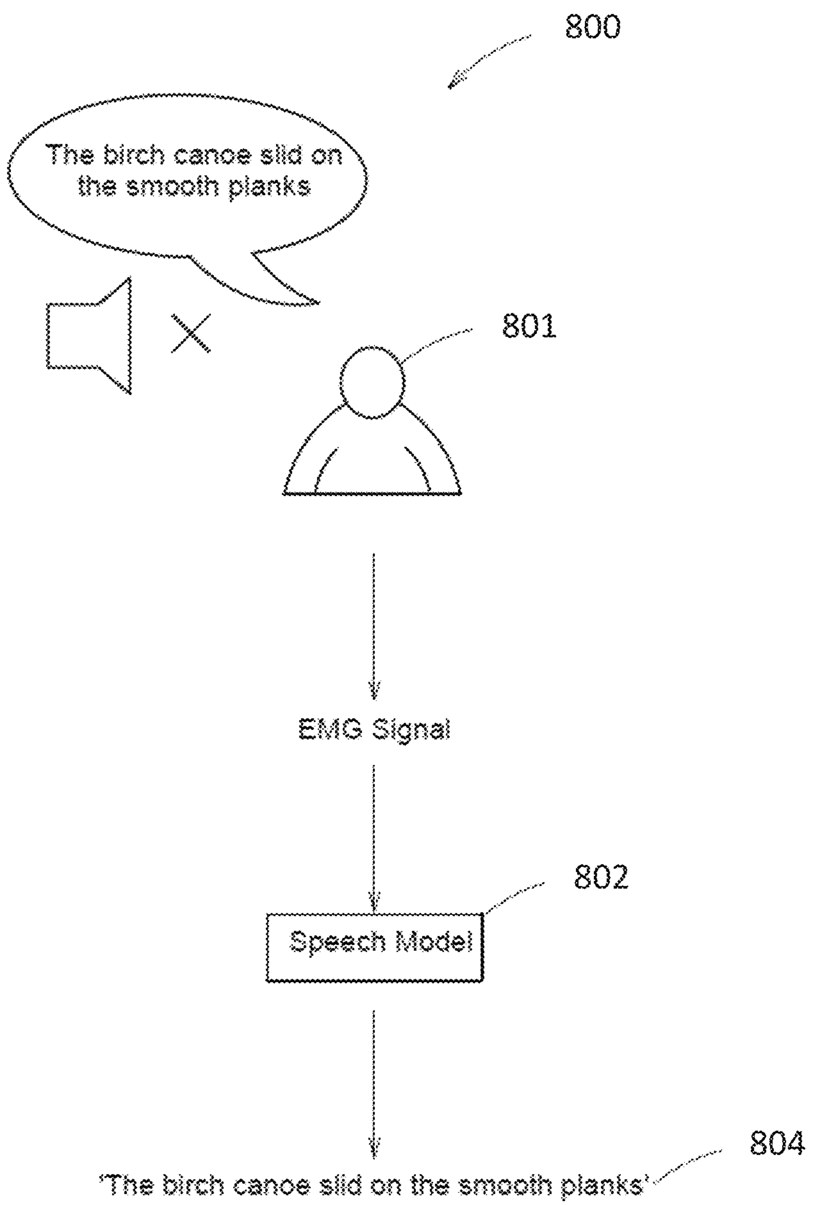
FIG. 8 is a scheme diagram of a speech model configured to decode speech to predict text or encoded features using EMG signals, in accordance with some embodiments of the technology described herein.

FIG. 8 is a scheme diagram of a speech model configured to decode speech to predict text or encoded features using EMG signals, in accordance with some embodiments of the technology described herein. The speech model may operate in a process flow, for example process flow 800. In some embodiments, the speech model 802 may be trained and installed in a wearable device, such as wearable device 100 of FIG. 1A or any other wearable device discussed herein. Alternatively, the speech model 802 may be installed in an external device (e.g., 220 in FIG. 2, 710A, 710B in FIG. 7). When deployed (for inference), the speech model 802 may be configured to receive sensor data indicative of the user's 801 speech muscle activation patterns (e.g., EMG signals) associated with the user's speech (voiced or silent) and use the sensor data to predict text or encoded features. As shown in FIG. 8, the user speaks silently "The birch canoe slid on the smooth planks" 804. The speech model 802 receives the EMG signals associated with the user's speech 804, where the EMG signals indicate the speech muscle activation patterns as discussed above and further herein. The speech model 802 outputs the text "The birch canoe slid on the smooth planks."

In some embodiments, the sensor data indicating the user's speech muscle activation patterns, e.g., EMG signals, may be collected using a wearable device. The speech model 802 may be trained to use the sensor data to predict text or encoded features. Although it is shown that the EMG signals is associated with the user speaking silently, it is appreciated that the EMG signals may also be associated with the user speaking loudly, or in whisper, and may be used train the speech model to predict the text or encoded features. Thus, domain of the signals used for inference (target domain) and the domain for signals for training the speech model (source domain) may vary, as will be further described.

In some embodiments, training data for the speech model 802 may be associated with a source domain (collection domain). In some embodiments, the source domain may be a voiced domain, where the signals indicating the user's speech muscle activation patterns are collected from voiced speech of training subject(s). In some embodiments, the source domain may be a whispered domain, where the signals indicating the user's speech muscle activation patterns are collected from whispered speech of training subject (s). In some embodiments, the source domain may be a silent domain, where the signals indicating the user's speech muscle activation patterns are collected from silent speech of training subject(s).

As described herein in the present disclosure, voiced (vocal) speech may refer to a vocal mode of phonation in which the vocal cords vibrate during at least part of the speech for vocal phonemes, creating audible turbulence during speech. In a non-limiting example, vocal speech may have a volume above a volume threshold (e.g., 40 dB when measured 10 cm from the user's mouth). In some examples, silent speech may refer to unvoiced mode of phonation in which the vocal cords are abducted so that they do not vibrate, and no audible turbulence is created during speech. Silent speech may occur at least in part while the user is inhaling, and/or exhaling. Silent speech may occur in a minimally articulated manner, for example, with visible movement of the speech articulator muscles, or with limited to no visible movement, even if some muscles such as the tongue are contracting. In a non-limiting example, silent speech has a volume below a volume threshold (e.g., 30 dB when measured about 10 cm from the user's mouth). In some examples, whispered speech may refer to unvoiced mode of phonation in which the vocal cords are abducted so that they do not vibrate, where air passes between the arytenoid cartilages to create audible turbulence during speech.

In some embodiments, the target domain (e.g., a domain used for inference) may preferably be silent domain. In some embodiments, the target domain may be whispered domain. It is appreciated, that the target domain may also be voiced domain or any other domain. In some embodiments, the source domain may be voiced domain, whispered domain, silent domain, or a combination thereof. For example, the training data for the speech model may be collected from both voiced speech and silent speech, each contributing to a respective portion of the training data.

Figure 9:
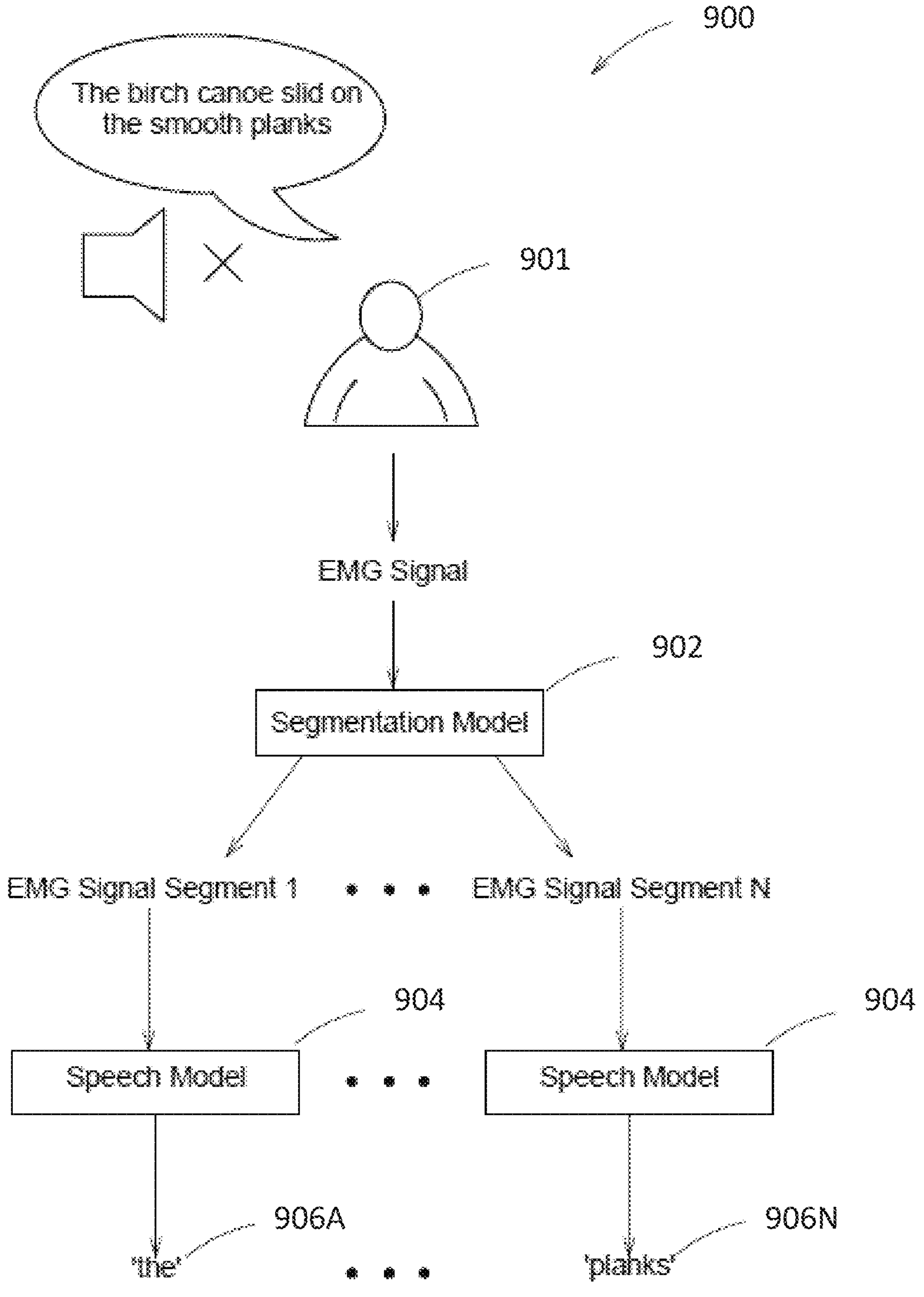
FIG. 9 is a scheme diagram of a speech model 904 configured to decode speech to predict text or encoded features using EMG signals and segmentation of the EMG signals, in accordance with some embodiments of the technology described herein.

FIG. 9 is a scheme diagram of a speech model 904 configured to decode speech to predict text or encoded features using EMG signals and segmentation of the EMG signals, in accordance with some embodiments of the technology described herein. As shown, FIG. 9 is similar to FIG. 8 with a difference in that the signals indicating the user's 901 speech muscle activation patterns (e.g., EMG signals) are segmented by a segmentation model 902 before being provided to the speech model 904. In the example process flow 900 shown, the EMG signals are segmented into a number of segments (e.g., 1, 2, . . . . N). These EMG signal segments are provided to the speech model 904, which is configured to output the text corresponding to each of the EMG signal segments. In some embodiments, the EMG signals are segmented by word, for example, the speech "The birch canoe slid on the smooth planks" is segmented by eight segments each corresponding to a respective word in the speech. As shown, the speech model 904 may output eight words 906A- . . . 906N each corresponding to a respective EMG signal segment. Although it is shown that segmentation model 902 segments the EMG signals by word, it is appreciated that the segmentation model may also be trained to segment the EMG signals in any other suitable manner, where each segment may correspond to a phoneme, a syllabus, a phrase, or any other suitable segment unit. Accordingly, the speech model 904 may be trained to predict text that corresponds to a signal segment (e.g., EMG signal segment), where a segment may correspond to a segmentation unit, e.g., a sentence, a phrase, a word, a syllable etc. In some embodiments, training a speech model (e.g., 904) for predicting text segments may including generating segmented training data, the details of which are further described with respect to FIG. 10.

Figure 10:
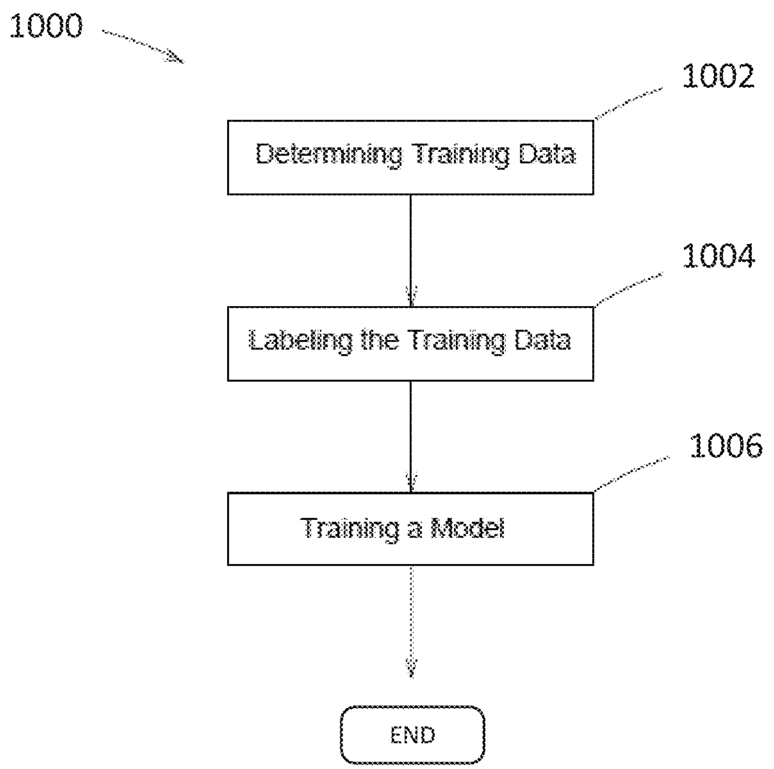
FIG. 10 is a flow diagram of an example process 1000 for training a speech model, in accordance with some embodiments of the technology described herein.

FIG. 10 is a flow diagram of an example process 1000 for training a speech model, in accordance with some embodiments of the technology described herein. As described herein, the speech model being trained may be embedded in a speech input device or in an external device external to the speech input device. In some embodiments, training process 1000 may include determining training data at act 1002, labeling the training data at act 1004, and using the labeled training data to train a model at act 1006. These acts are further described in detail.

In some embodiments, act 1002 may be performed for an individual user, for a group of users, for one or more collection domains (as described above and further herein), and/or otherwise performed. In some embodiments, training data may be generated in one or more sampling contexts at act 1002. A sampling context may refer to an environment in which the training data is generated. For example, a sampling context may include the training subject being presented with a prompt (e.g., in a data collection center), and speaking the prompt in the source (collection) domain (e.g., voiced, whispered, silent, etc.). The prompt may be text (e.g., a script), audio prompt, and/or any other prompt. In some embodiments, a training system may output the prompt (e.g., display a phrase on a screen, or play an audio prompt in an audio device) to a training subject and ask the training subject to repeat the phrase using voiced speech, whispered speech, and/or silent speech.

In non-limiting examples, the training system may ask the training subject to use voiced speech in one or more voiced speech trials, to use silent speech in one or more silent speech trials, and/or to use whispered speech in one or more whispered speech trials, where each trial corresponds to a single prompt or a set of prompts. In some embodiments, voiced speech trials may be arranged between sets of silent speech trials. For example, a voiced speech trial may be used every K silent speech trial, where K may be in a range of 1-1000, or 5-100, or may be in a range greater than a threshold value, e.g., greater than 1000.

In some embodiments, the training system may provide auditory feedback to improve the accuracy of training data collection, training data labeling, and/or otherwise improve the model training. For example, the auditory feedback may include voice converted from the inferred text from the silent or whispered speech, where the training system may play back the auditory feedback to the training subject during the training data collection.

In some embodiments, prompts in collecting the training data may be segmented. For example, the training subject and/or another person may optionally delineate the start and/or end of each: prompt, sentence within the prompt, word within the prompt, syllable within the prompt, and/or any other segment of the prompt. Additionally, and/or alternatively, auxiliary measurements (e.g., video of the training subject while speaking, inertial measurements, audio, etc.) sampled during test subject speaking may be used to determine the prompt segmentation (e.g., each segment's start and end timestamps).

In some embodiments, a sampling context for generating training data may not include a prompt. Rather, training data may be collected during spontaneous speech. For example, the training data is sampled when the training subject may speak (e.g., voiced, whispered, silent, etc.) and/or perform other actions in their usual environment (e.g., attending meetings, taking phone calls, etc.). In such context, background training data can be collected, where the background training data includes user's speech responsive to operation mode selection by the user (e.g., turning on the device, user indication to interpret the signals, etc.) and/or without operation mode selection by the user (e.g., continuous data collection, automatic data collection responsive to a sensed event, etc.). In some embodiments, background training data collected without explicit prompts may enable training and/or calibrating a personalized speech model, training and/or calibrating a continual (e.g., outside of data collection centers; while all or parts of the system are not in active use for silent speech decoding and/or for controlling a device based on decoded silent speech; etc.), decreasing silent speech decoding errors, and/or providing other advantages.

In some embodiments, sampling context for generating training data may include other scenarios, e.g., the user's action associated with speaking. For example, the sampling context may include user sitting, walking, jumping up and down, or taking other actions when speaking.

In some embodiments, training data may be collected by using one or more measurement systems containing one or more sensors such as described herein, for example using a wearable device as described herein. In some embodiments, the measurement systems may include an electrophysiology measurement system including one or more sensors configured to captured one or more types of signals that indicate the user speech muscle activation patterns associated with the user's speech, e.g., EMG signals, EEG signals, EOG signals, ECG signals, EKG signals, etc. or other suitable biometric measurement systems. In some embodiments, the measurement systems may include one or more of: motion sensor (e.g., IMU), microphone, optical sensors configured to detect the movement of the user's skin (e.g., infrared cameras with a dot matrix projector), video cameras configured to capture images, videos, motion capture data, etc., sensors configured to detect blood flow (e.g., PPG, fNIRS), thermal cameras, depth/distance sensors (e.g., Time of Flight sensors), and/or any other measurement systems. Data collected from a measurement system can correspond to a measurement modality.

In some embodiments, EMG sensors may be placed on a training subject to capture the training data. For example, EMG sensors may be placed at or near any target zones, such as shown in FIG. 1B. For example, EMG sensors may be placed on and/or under the jaw, on the check, at and/or below the check bone, at and/or near the temporomandibular joint, and/or any other location on the face. In some embodiments, the EMG sensors may be positioned more than a threshold distance away from the face midline. The threshold distance may be between 2 cm-15 cm or any range or value therebetween but can alternatively be less than 2 cm or greater than 15 cm. As such, EMG sensors may be less intrusive and/or more ergonomic. In some embodiments, EMG sensors may optionally be positioned on only one side of the user's face or on both sides of the face. The number of EMG sensors may be between 2-100 or in any range or value therebetween (e.g., 5-20), but can alternatively be less than 2 or greater than 100. During inference, EMG sensors may be placed in a similar region as they are placed in collecting the training data during training.

In some embodiments, training data may be synthetically generated. In some embodiments, training data captured in one domain may be used to generate training data in another domain. For example, synthetic silent domain measurements may be generated by sampling voiced domain measurements and subtracting the glottal vibrations (e.g., determined using an accelerometer, a microphone, etc.). In another example, a model may be trained to generate synthetic silent domain measurements based on voiced domain measurements (e.g., using paired silent and voiced measurements for the same training subject, for the same prompt, etc.). For example, the model can be trained using generative and/or de-noising methods (e.g., Stable Diffusion).

In some embodiments, a relationship between sets of source domain training data generated in different sampling contexts may be used to augment target domain training data. For example, voiced speech training data may include paired examples of a training subject using voiced speech across two or more sampling contexts (e.g., sitting, walking, jumping up and down, other actions, etc.). A mapping function may be inferred between two sampling contexts (e.g., sitting to walking), where the mapping function can be applied to silent speech training data sampled in the first sampling context to generate synthetic silent speech training data in the second sampling context. In some embodiments, synthetic training data may be generated by introducing artifacts and/or otherwise altering sampled training data.

With further reference to FIG. 10, act 1004 may be performed to pair the training data with speech labels, where the training data may be indicative of a training subject's speech muscle activation patterns associated with the subject speaking (e.g., EMG measurements). Speech labels may include text, audio, word segmentation, phrase segmentation, intonation, and/or any other speech information associated with the training data. In some embodiments, a speech label may include a prompt (e.g., text from a prompt that was used for the training system to prompt the user to speak and thus collect training data). In some embodiments, a speech label may include text and/or audio determined based on ground truth measurements taken when the training data is being collected. Ground truth measurements may include sensor data associated with training data collection. For example, ground truth measurements may include: audio, video, motion data, and/or any sensor data captured from other measurement modalities. In some embodiments, ground truth measurements may be collected in a ground truth measurement system. A ground truth measurement system may include: a microphone, a video camera, and/or one or more sensors as described above with respect to a wearable device as described herein or any other suitable measurement devices.

In some examples, ground truth audio signals (e.g., captured from a microphone or a video camera) may be converted to a text speech label (e.g., using ASR or converted manually). In other examples, ground truth videos may be converted to a text speech label (e.g., using automated lip reading or converted manually). For example, facial kinematics may be extracted from a ground truth video of a training subject when speaking during the training data collection. Lip reading may use the extracted facial kinematics to convert the video to a text speech label. Additionally, and/or alternatively, ground truth measurements may be used to validate, correct, and/or otherwise adjust another speech label. For example, a speech label including a prompt text may be corrected based on a ground truth measurement as will be further described in detail with reference to FIG. 11.

Figure 11:
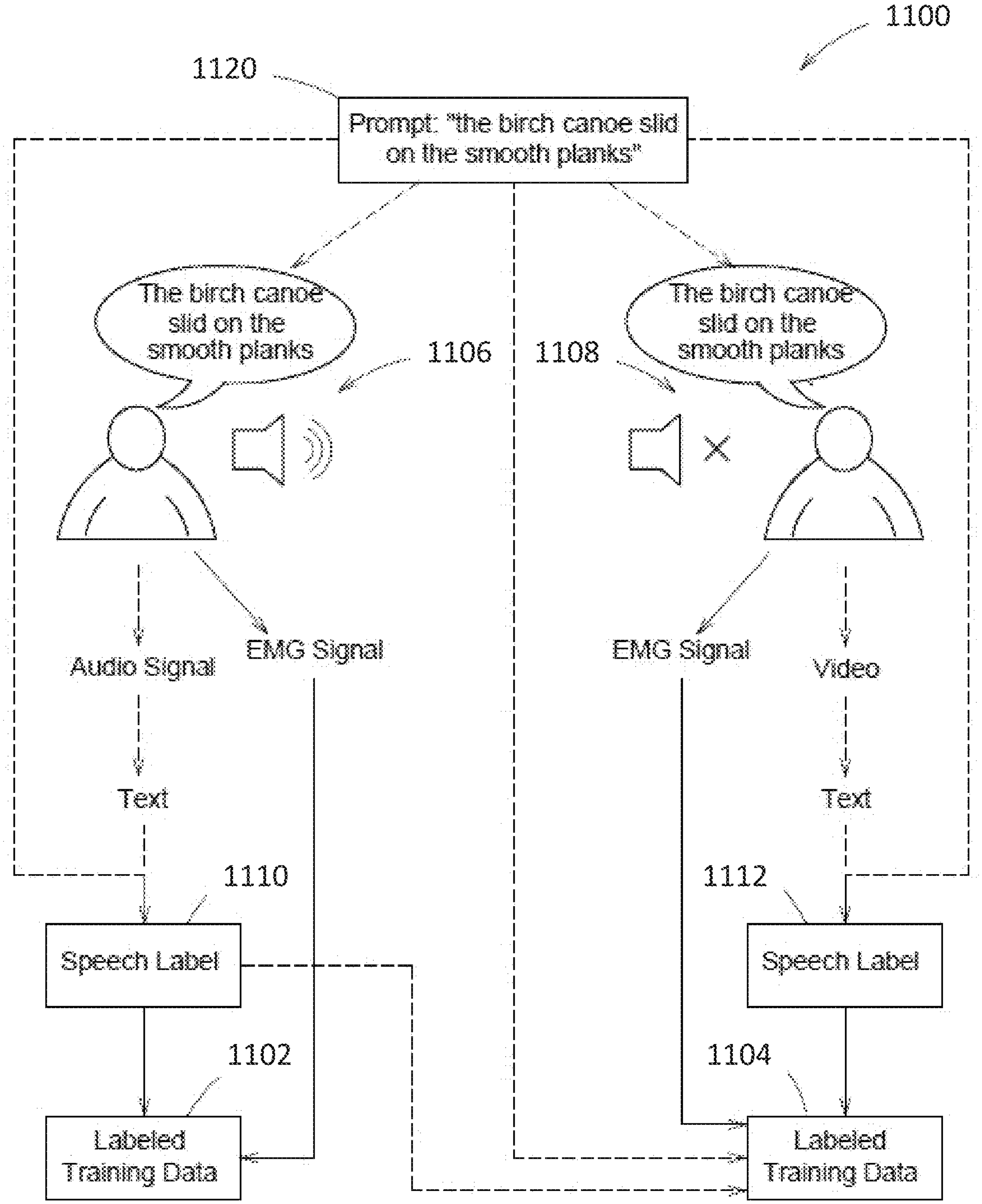
FIG. 11 is a scheme diagram of generating labeled training data for a speech model using different types of measurements to generate speech labels for the labeled training data, in accordance with some embodiments of the technology described herein.

FIG. 11 is a scheme diagram of generating labeled training data for a speech model using different types of measurements to generate speech labels for the labeled training data, in accordance with some embodiments of the technology described herein. Labeled training data may include paired training data and speech labels as described above and further herein. In some embodiments, in generating the labeled training data, a speech label associated with training data may be predetermined. For example, the speech label may include a prompt that was used to prompt the user to speak when collecting the training data. In some embodiments, in generating the labeled training data, speech labels associated with training data may be determined using ground truth measurements sampled concurrently with the training data, where the training data (e.g., EMG signals indicating a user's speech muscle activation patterns) and the speech labels may be generated from the same or different domains.

As shown in FIG. 11, labeled training data 1102 and labeled training data 1104 are generated, in process flow 1100, respectively in a voiced domain 1106 (in which the user speaks in a voiced speech) and a silent domain 1108 (in which the user speaks silently). In the voiced domain 1106, the user is prompted with text 1120 and the user speaks the prompt in a voiced speech. EMG signals are collected (e.g., using any of the modalities as described above and further herein) while the user is speaking in the voiced speech. Ground truth audio signal collected from the user speaking may be converted (e.g., using ASR) to a text speech label 1110 to generate the labeled training data 1102. In the silent domain 1108, the user speaks the prompt in a silent speech. EMG signals are collected (e.g., using any of the modalities as described above and further herein) while the user is speaking silently. Ground truth video collected from the user speaking may be converted (e.g., using lip reading as described herein) to a text speech label 1112 to generate the labeled training data 1104.

In some embodiments, labeled training data generated in one domain may be corrected by ground truth measurements collected in another domain. For example, as shown in FIG. 11, labeled training data 1104 generated from the speech label in the silent domain 1108 may be corrected by the speech label 1110 that was generated using the ground truth measurements collected in the voiced domain 1106. In other variations, labeled training data 1102 may be generated from the speech label 1110 in the voiced domain and corrected from the speech label 1112 generated in the silent domain.

Returning to FIG. 10, labeling the training data at act 1004 may include temporally align the speech labels to the training data. For example, the training data may be segmented (e.g., into sentences, phrases, words, syllables, etc.), wherein each training data segment is aligned to a respective speech label. In some embodiments, the training data may be segmented (e.g., manually or automatically) after the training data is collected. In some embodiments, the training data may be segmented while being collected. For example, the subject providing the speech training data, or another person may manually segment the data while being collected. In some embodiments, the training data may be segmented (during or after the data collection) using measurements acquired during the training data collection. For example, the measurement acquired during the training data collection may include information indicative of the start/end time of each training data segment, details of which are further described.

In non-limiting examples, automatic speech recognition (ASR) may be used on sampled speech audio to detect the start/end time for each voiced segment (e.g., word, phrase, etc.), where the start/end time for each voiced segment may be used to determine the training data segment (e.g., EMG measurement) associated with the voiced segment. The ASR may be used concurrently while the speech audio is sampled. Alternatively, the ASR may be used after the speech audio is collected. In other non-limiting examples, lip reading (e.g., extracting facial kinematics from videos captured during the user speaking) may be used to detect the start/end time for each training data segment. The video may be captured using a speech input device having a camera integrated therein, such as on the sensor arm.

It is appreciated that the video may be captured in any other suitable manner, for example, from a camera on a desktop computer facing the user while the user is speaking. In other non-limiting examples, pause detection may be used to detect the start/end time of a training data segment. Pause detection may be applied to sensor data (e.g., speech audio from a microphone, EMG data from an EMG sensor, sensor data from an inertial sensor, etc. collected during a user's speech) to delineate a start/end time of a training data segment. It is appreciated that, the training data segments, which are temporally aligned with speech labels, may be used to train the speech model to predict text from segmented signals associated with user speaking (e.g., EMG signals), such as described in embodiments in FIG. 9.

Although embodiments are described for training a speech model using segmented training data, it is appreciated that segmentation of training data may be optional. For example, the speech label may be a text prompt of a phrase, where the training data associated with the user speaking (e.g., voiced, whispered, silently, etc.) may be labeled with the entire text prompt.

With further reference to FIG. 10, at act 1006, the speech model may be trained iteratively using self-supervised learning, semi-supervised learning, supervised learning, unsupervised learning, transfer learning, reinforcement learning, and/or any other suitable training method. In training the speech model, the training data may include target domain training data and/or source domain training data as described herein, e.g., in embodiments of FIG. 10. Target domain training data refers to data collected in the domain in which signals are used in inference, where source domain training data refers to data collected in the domain in which signals are used in training the speech model. Various methods may be used to process the target domain training data and source domain training data, the details of which are further described with reference to FIG. 12.

Figure 12:
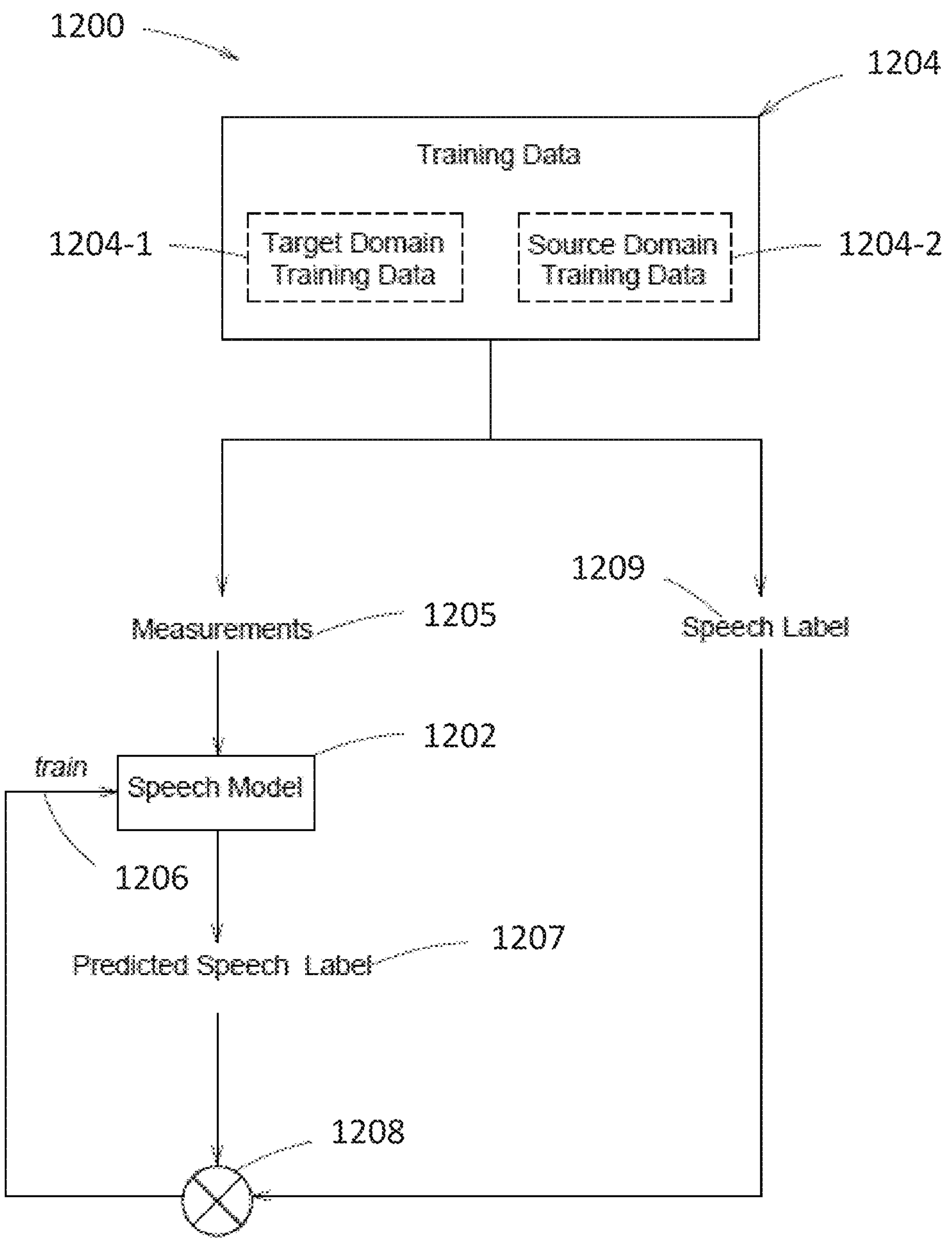
FIG. 12 is a scheme diagram 1200 of training a speech model using training data collected in different domains, in accordance with some embodiments of the technology described herein.

FIG. 12 is a scheme diagram 1200 of training a speech model using training data collected in different domains, in accordance with some embodiments of the technology described herein. The speech model 1202 may be trained using a combination of target domain training data 1204-1 and source domain training data 1204-2, where the target domain training data and the source domain training data may be combined in different manners. In some embodiments, the training data 1204 may include randomly shuffling source domain training data 1204-2 and target domain training data 1204-1. In some embodiments, the speech model 1202 may be initially trained using source domain training data (e.g., only source domain training data, above a threshold proportion of source domain training data, etc.). In subsequent training iterations, an increased proportion of target domain training data may be used. In other embodiments, the speech model 1202 may be initially trained using source domain training data, and subsequently, the speech model 1202 may be tuned using target domain training data. It is appreciated that the target domain training and source domain training data may be combined in other suitable manners. The measurements 1205 associated with a particular word or phrase within training data 1204 may be separated from the speech label 1209 of the word or phrase and input into model 1202. The speech model 1202 may output a predicted speech label 1207, which is compared to speech label 1209 at 1208. Feedback 1206 may be generated based on the comparison and this may be used to train model 1202.

Although embodiments of dividing training data into target domain training data and source domain training data are shown in FIG. 12, in other variations, the speech model may optionally be trained using training data that includes different measurement modalities such as described above and further herein. In some embodiments, a subset of the modalities may be selected (e.g., for a training iteration, for a set of measurements, for a training subject, etc.). For example, the speech model may be initially trained using audio signals and EMG signals labeled with speech labels. In subsequent training iterations, only EMG signals and no audio signals are used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, modules, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 6, and 10. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B." when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within +20% of a target value in some embodiments, within +10% of a target value in some embodiments, within +5% of a target value in some embodiments, within +2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A wearable device comprising:

a plurality of sensors configured to measure signals at a face, head, or neck of a user, the signals being indicative of facial activity associated with an act performed by the user, the sensors comprising a plurality of EMG electrodes configured to record signals at a cheek of the user associated with movement of facial muscles of the user and a microphone;

a memory storing instructions thereon;

a processor configured to execute a signal analysis component by executing the instructions, wherein the instructions, when executed by the processor, are configured to cause the signal analysis component to analyze the signals and generate an activation signal responsive to results of the analysis of the signals, the signal analysis component configured to generate the activation signal in response to:

determining a signal from the EMG electrodes is above a respective threshold; and determining a voice level of the user in a signal recorded by the microphone is below a respective threshold voice level; and a control component configured to activate the wearable device in response to the activation signal.

2. The wearable device of claim 1, wherein the signal analysis component is configured to generate the activation signal in response to determining the user is silently speaking.

3. The wearable device of claim 1, wherein the signal analysis component is configured to generate the activation signal in response to: determining the user is silently speaking or determining the user has performed a particular action.

4. The wearable device of claim 3, wherein the particular action includes the user clenching their teeth, tapping a cheek, or an action associated with the user preparing to speak.

5. The wearable device of claim 1, wherein the control component is configured to activate the wearable device by activating a communication component of the device and transmitting the signals to a connected device.

6. The wearable device of claim 1, wherein the control component is configured to activate the wearable device by activating a processor of the device to determine one or more words or phrases from the measured signals.

7. The wearable device of claim 1, wherein the plurality of sensors further comprises:

an inertial measurement unit (IMU) configured to measure vibrations associated with voiced speech of the user, and wherein the signal analysis component is configured to generate the activation signal in response to determining a signal from the EMG electrodes is above a respective threshold and a signal recorded by the IMU is below a respective threshold level.

8. The wearable device of claim 1, wherein the signal analysis component is configured to:

in response to determining the signal is above the respective threshold, perform template matching of parts of the signal to parts of a known speech signal; and in response to determining, based on the template matching, a measure of similarity between the signal and the known signal is above a threshold level of similarity, generate the activation signal.

9. The wearable device of claim 8, wherein the signal analysis component is further configured to:

in response to determining the signal is above the respective threshold, perform template matching of parts of the signal to parts of a known action signal.

10. The wearable device of claim 1, wherein the signal analysis component is further configured to:

in response to determining the signal is above the respective threshold, analyze signals from a first subset of the plurality of sensors to determine a probability of whether the user is speaking;

generate the activation signal in response to determining the probability is above a first threshold probability; and in response to determining the probability is below the first threshold probability and above a second threshold probability, analyze signals from a second subset of the plurality of sensors comprising more sensors than the first subset of sensors to determine whether the user is speaking.

11. A wearable device comprising:

a plurality of sensors configured to measure signals at a face, head, or neck of a user, the signals being indicative of facial activity associated with an act performed by the user;

a memory storing instructions thereon;

at least one processor configured to execute a signal analysis component based on the instructions, wherein the instructions, when executed by the at least one processor configured to analyze the signals and generate an activation signal responsive to determining a signal of the measured signals is above a respective threshold; and a controller configured to activate the wearable device in response to the activation signal, wherein the signal analysis component is further configured to:

in response to determining the signal is above the respective threshold, perform template matching of parts of the signal to parts of a known speech signal;

in response to determining, based on the template matching, a measure of similarity between the signal and the known signal is below the threshold level of similarity and above a second level of similarity, analyze the signal using a trained machine learning model to determine whether the user is speaking; and generate the activation signal in response to determining the user is speaking.

12. The wearable device of claim 1, wherein the plurality of sensors comprises:

a plurality of EMG electrodes configured to record signals at a cheek of the user associated with movement of facial muscles of the user; and wherein the signal analysis component is further configured to:

determine a whether the wearable device has proper placement on the user by analyzing an impedance of a subset of EMG electrodes of the plurality of EMG electrodes; and in response to determining the wearable device has proper placement on the user, analyze the signals.

13. The wearable device of claim 8, wherein the signal analysis component is further configured to:

in response to determining the signal is above the respective threshold, perform analog to digital conversion of the signals at a first sampling frequency to generate first digital signals;

analyze the first digital signals to determine a probability of whether the user is speaking; and generate the activation signal in response to determining the probability is above a first threshold probability.

14. The wearable device of claim 13, wherein the signal analysis component is further configured to perform analog to digital conversion of the signals at a second sampling frequency, higher than the first sampling frequency in response to determining the probability is below the first threshold probability and above a second threshold probability.

15. A method for controlling a wearable device comprising:

recording signals, using a plurality of sensors, indicative of facial activity associated with an act performed by a user, at a face, head, or neck of the user;

analyzing the recorded signals; and activating the wearable device based on the analyzing, wherein analyzing the signals comprises generating an activation signal by:

determining a signal of the recorded signals is above a respective threshold;

in response to determining the signal is above the respective threshold, analyze signals from a first subset of the plurality of sensors to determine a probability of whether the user is speaking;

generating the activation signal in response to determining the probability is above a first threshold probability; and in response to determining the probability is below the first threshold probability and above a second threshold probability, analyze signals from a second subset of the plurality of sensors comprising more sensors than the first subset of sensors to determine whether the user is speaking.

16. The method of claim 15, wherein the analyzing comprises determining a probability the user is silently speaking and determining a probability the user has performed a particular action and the activating is performed in response to determining the probability the user is silently speaking or the probability the user has performed a particular action is greater than a respective threshold probability.

* * * * *